(12) United States Patent
Ryu et al.

(10) Patent No.: US 12,225,482 B2
(45) Date of Patent: Feb. 11, 2025

(54) USING AUTOMATIC GAIN CONTROL TO INDICATE TARGET SIDELINK RECEIVING UE

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Kobi Ravid, Closter, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/650,782

(22) Filed: Feb. 11, 2022

(65) Prior Publication Data

US 2023/0262618 A1 Aug. 17, 2023

(51) Int. Cl.
*H04W 52/52* (2009.01)
*H04L 27/26* (2006.01)
*H04W 72/02* (2009.01)
*H04W 72/0446* (2023.01)

(52) U.S. Cl.
CPC ......... *H04W 52/52* (2013.01); *H04L 27/2607* (2013.01); *H04W 72/02* (2013.01); *H04W 72/0446* (2013.01)

(58) Field of Classification Search
CPC . H04W 52/52; H04W 72/02; H04W 72/0446; H04L 27/2607; H04L 5/0048; H04L 5/0053; H04L 27/2613
USPC ............. 370/318; 455/41.1–41.2, 450–452.2
See application file for complete search history.

(56) References Cited

U.S. PATENT DOCUMENTS

| | | | |
|---|---|---|---|
| 2021/0127377 A1* | 4/2021 | Lee | ...................... H04L 27/2602 |
| 2022/0046430 A1* | 2/2022 | Liu | ...................... H04B 7/0695 |
| 2024/0015711 A1* | 1/2024 | Su | ......................... H04W 72/23 |

* cited by examiner

*Primary Examiner* — Michael Y Mapa
(74) *Attorney, Agent, or Firm* — Arun Swain

(57) ABSTRACT

Aspects are provided which allow AGC symbols to be applied for identifying or indicating target Rx UEs of sidelink communications from Tx UEs. A Tx UE transmits an AGC signal to a Rx UE in a RB associated with the Rx UE. The Rx UE receives the AGC signal from the Tx UE. The Tx UE transmits sidelink data to the Rx UE after the AGC signal. The Rx UE decodes sidelink data from the Tx UE in response to the AGC signal being received in a RB associated with the Rx UE. The Rx UE refrains from decoding the sidelink data from the Tx UE in response to the AGC signal being received in a different RB than the RB associated with the Rx UE. In this way, Rx UEs may save monitoring and processing power and time in receiving and decoding sidelink communications.

30 Claims, 15 Drawing Sheets

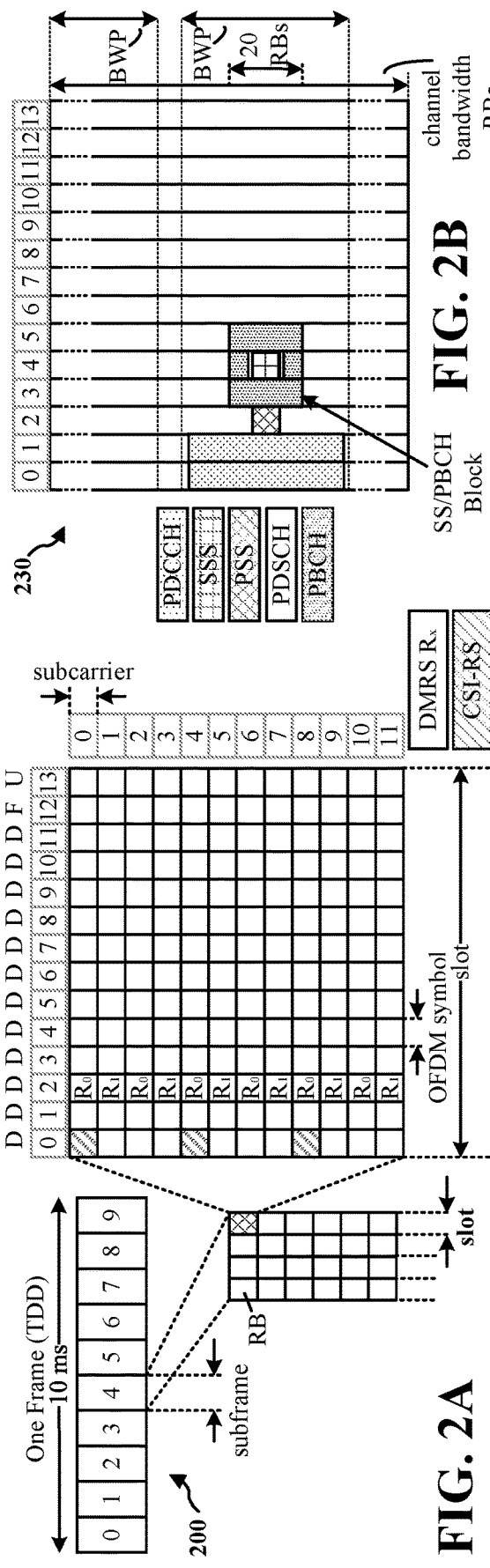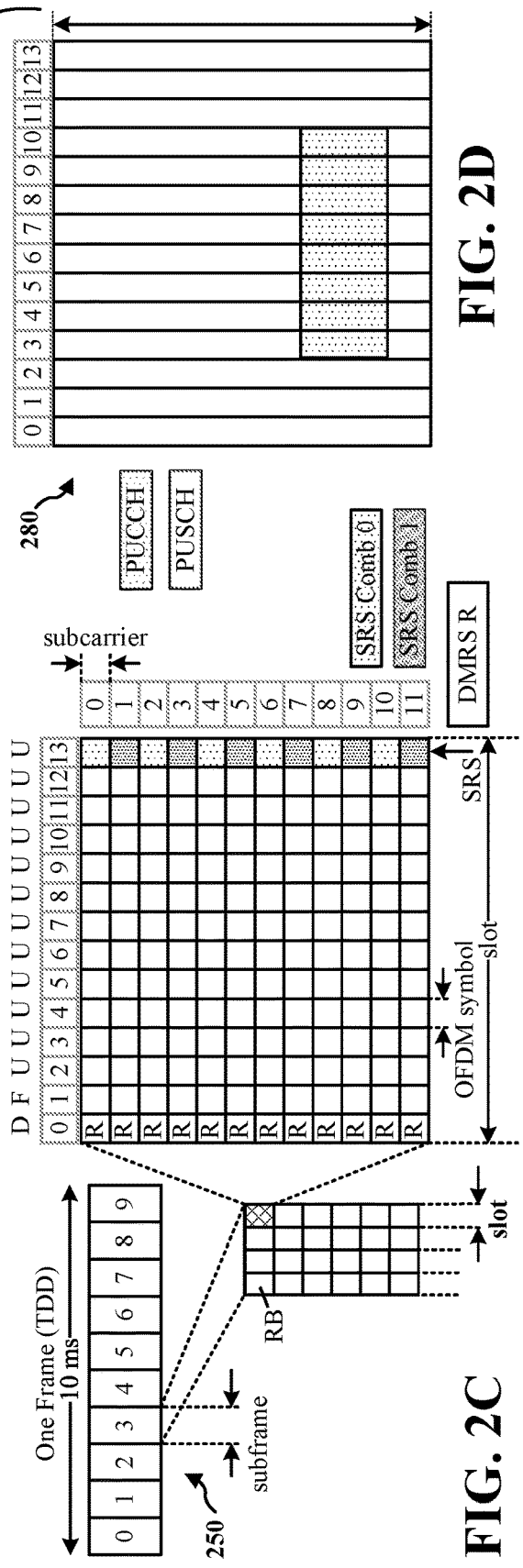

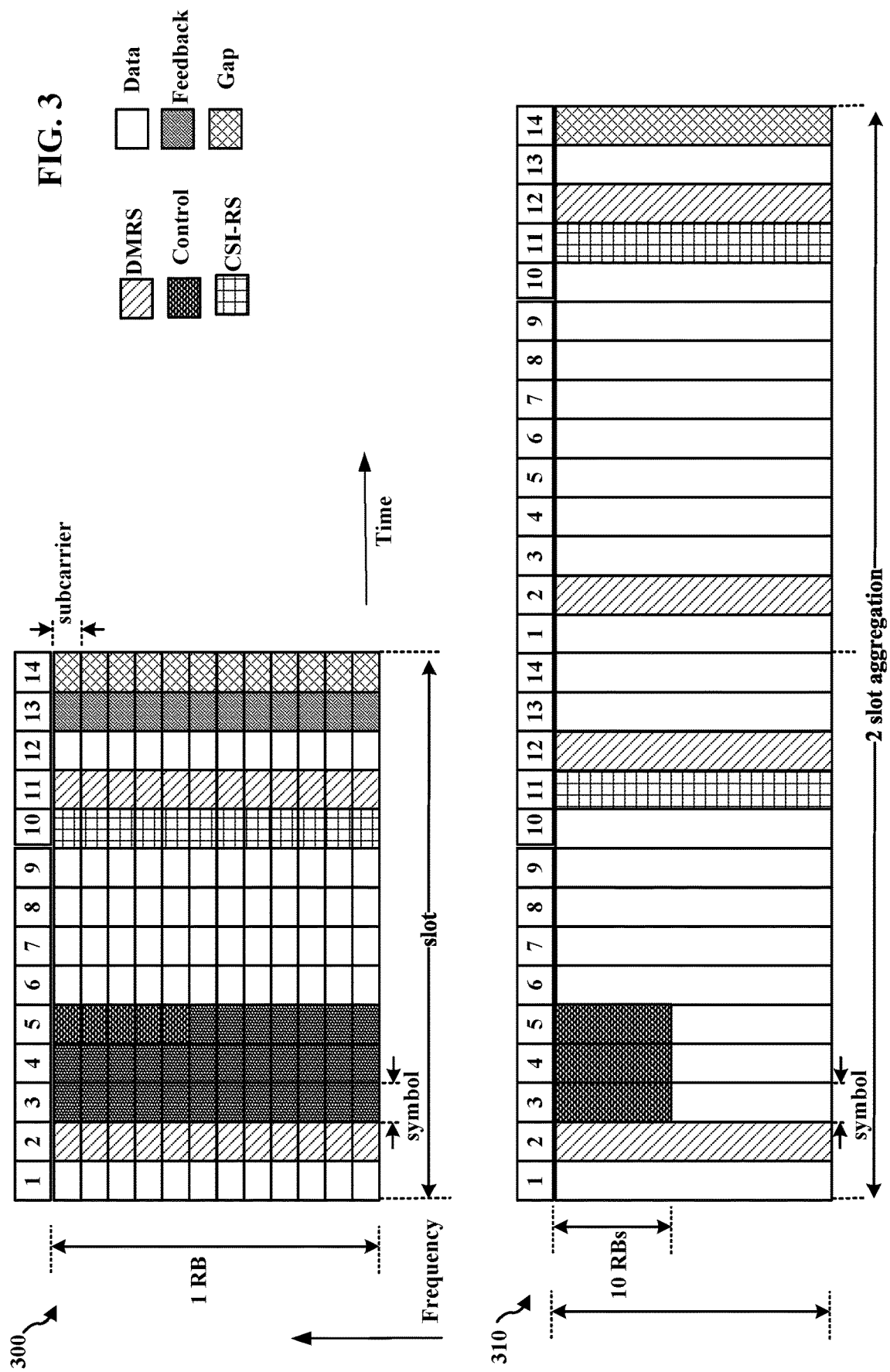

USING AUTOMATIC GAIN CONTROL TO INDICATE TARGET SIDELINK RECEIVING UE

BACKGROUND

Technical Field

The present disclosure generally relates to communication systems, and more particularly, to wireless, sidelink communication between user equipments (UEs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first UE (e.g., a transmitting [Tx] UE) which transmits an automatic gain control (AGC) signal to a second UE, where the AGC signal is transmitted in a resource block (RB) associated with the second UE. The apparatus transmits sidelink data to the second UE after the AGC signal.

In an aspect of the disclosure, a method, a computer-readable medium, and an apparatus are provided. The apparatus may be a first UE (e.g., a receiving [Rx] UE) which receives an AGC signal from a second UE. The apparatus decodes sidelink data from the second UE in response to the AGC signal being received in a RB associated with the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 3 illustrate example aspects of a sidelink slot structure.

DETAILED DESCRIPTION

Figure 1:
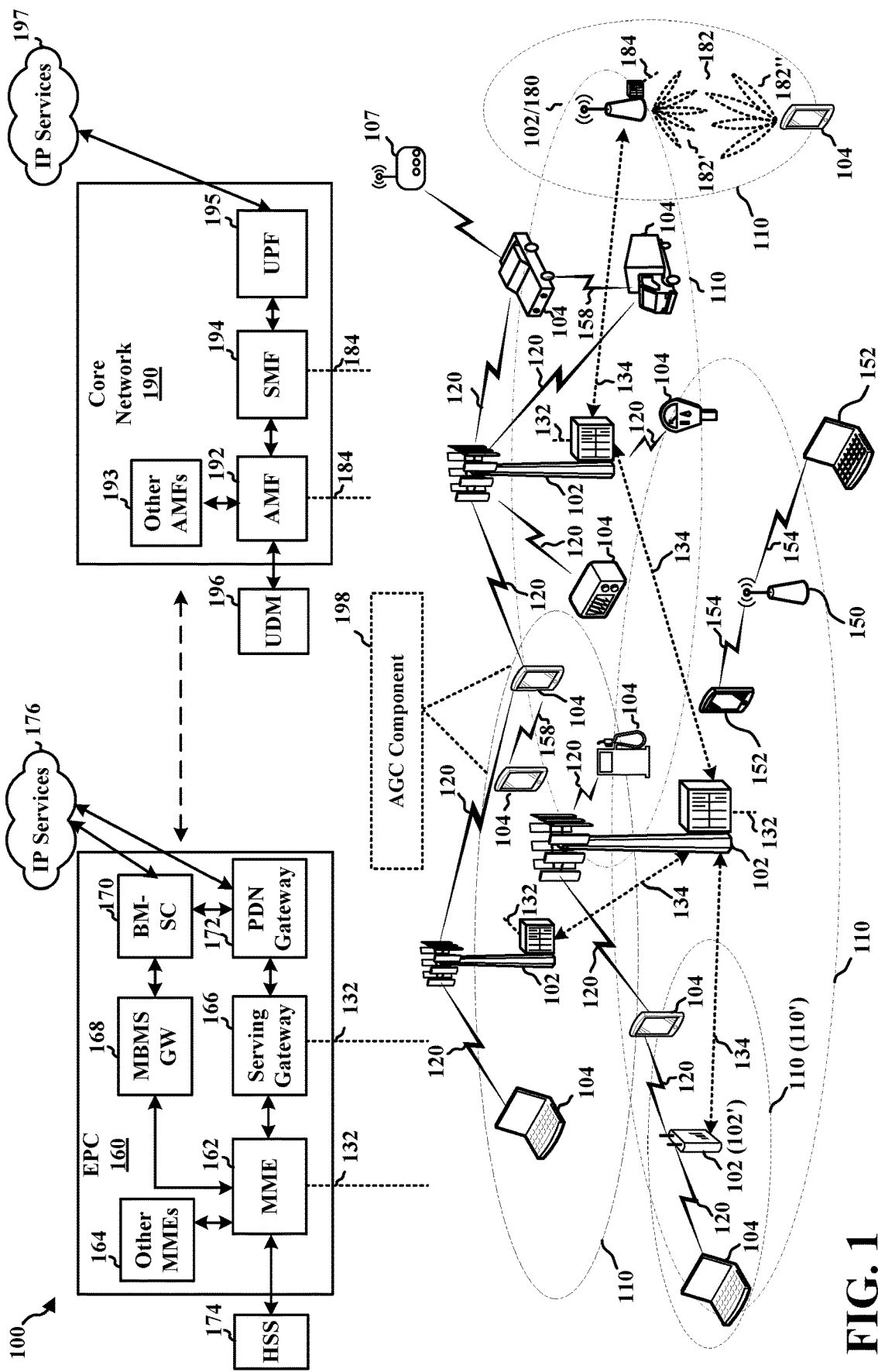
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, in sidelink communications, a Tx UE initially achieves sidelink synchronization with a Rx UE. Following synchronization, the Tx UE may obtain an allocation of time-frequency resources, e.g., one or more slots, RBs, or subchannels in a resource pool, in which to transmit sidelink data to the Rx UE. After determining the resources, the Tx UE may send sidelink control information (SCI) including the resource allocation in a physical sidelink control channel (PSCCH) to the Rx UE. The Tx UE may transmit the SCI in two stages, including a first-stage SCI carried on PSCCH, and a second-stage SCI carried on a physical sidelink shared channel (PSSCH). First-stage SCI may contain information about the resource allocation, while second-stage SCI may carry information for identifying and decoding the sidelink data. The Tx UE may transmit the sidelink data in the PSSCH to the Rx UE in the allocated resources. Upon receiving the sidelink transmission, the Rx UE may attempt to blindly decode the PSCCH in all of the allocated subchannels of the resource pool. If the Rx UE successfully decodes the PSCCH, the UE may also attempt to decode the PSSCH scheduled by the PSCCH for the sidelink data.

Sidelink slots contain OFDM symbols that can be used for sidelink communication. Sidelink slots may also include mini-slots such as those applied in access network communication (e.g., over a Uu interface). Mini-slots generally include any number of symbols less than that of a slot (for example, 2, 4, 7 or other number of OFDM symbols). A sidelink slot may be segmented into mini-slots to reduce latency and result in more efficient resource utilization in sidelink communication.

When a Tx UE sends a sidelink communication in a slot or a mini-slot to a Rx UE, the Tx UE transmits an AGC signal in an AGC symbol for that slot or mini-slot. The AGC signal allows an Rx UE to perform AGC on subsequent signals in order to increase the likelihood of successful decoding of the subsequent signal. For instance, in response to the AGC signal, the Rx UE may successfully adjust the gain of subsequent signals received into the UE's analog-to-digital converter (ADC) in order to prevent ADC range overflows or underflows that may prevent decoding of subsequent sidelink data from the Tx UE.

Currently, in response to receiving a sidelink communication including an AGC symbol for setting AGC, first-stage SCI including a resource allocation for PSCCH, and second-stage SCI including decoding information for PSSCH, the Rx UE may identify whether a received sidelink slot or mini-slot is intended for the Rx UE. If the Rx UE is identified to be the target Rx UE for that sidelink communication, the Rx UE may successfully decode the sidelink data in the allocated resources. However, as the Rx UE may not ascertain whether a slot or mini-slot is intended for that Rx UE prior to decoding the PSSCH, the Rx UE blindly monitors for and processes the SCIs in each sidelink communication that it receives. Such blind monitoring and processing may take significant power and time. Moreover, when a sidelink communication includes multiple mini-slots, and thus multiple instances of SCIs for potentially different UEs, the amount of time and power involved in the monitoring and processing may be further increased. Thus, it would be helpful to allow Rx UEs to more efficiently monitor and process received sidelink communications from Tx UEs.

Accordingly, aspects of the present disclosure allow a Tx UE to indicate via the AGC symbol the target Rx UE of a sidelink communication in order to reduce the monitoring and processing time of the Rx UE. For instance, a Tx UE may indicate a target Rx UE for a sidelink communication in an AGC symbol based on an RB which contains the AGC symbol. As a result, an Rx UE which determines from the AGC symbol that it is not the target of the sidelink communication including that AGC symbol, may refrain from monitoring for and processing the SCI in that sidelink communication and thereby save significant monitoring and processing time. For example, rather than decoding each SCI in every mini-slot of a sidelink slot to determine whether the mini-slot contains sidelink data intended for an Rx UE, the Rx UE may more quickly and efficiently determine this information from each AGC symbol and refrain from decoding SCIs not intended for that Rx UE in response to the information in the AGC symbol, thereby conserving use of power and time.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication, e.g., as described in connection with the example in FIG. 3.

Although the present disclosure may focus on V2X/D2D or other sidelink communication in connection with 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 (e.g., a Tx UE or a Rx UE) may include an AGC component 198. When the UE 104 (a first UE) is a Tx UE, the AGC component is configured to transmit an AGC signal to a second UE (e.g., a Rx UE), where the AGC signal is transmitted in a RB associated with the second UE, and to transmit sidelink data to the second UE after the AGC signal. When the UE 104 (a first UE) is a Rx UE, the AGC component 198 is configured to receive an AGC signal from a second UE (e.g. a Tx UE), and to decode sidelink data from the second UE in response to the AGC signal being received in a RB associated with the first UE.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

FIG. 3 illustrates example diagrams 300 and 310 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include minislots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
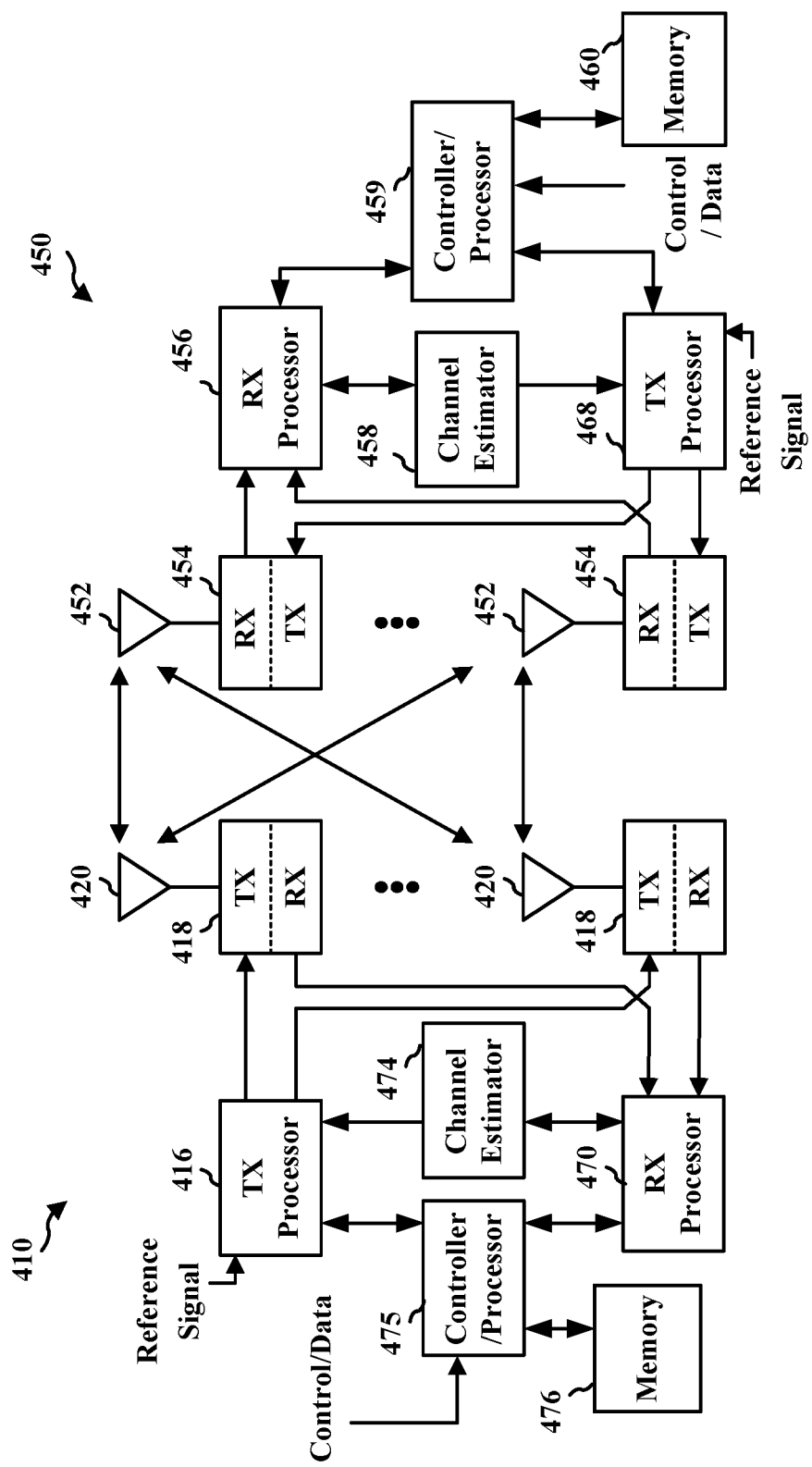
FIG. 4 is a diagram illustrating an example of a first device and a second device involved in wireless communication based, e.g., on sidelink communication.

FIG. 4 is a block diagram of a first wireless communication device 410 in communication with a second wireless communication device 450, e.g., via V2V/V2X/D2D communication or in an access network. The device 410 may comprise a transmitting device communicating with a receiving device, e.g., device 450, via V2V/V2X/D2D communication. The communication may be based, e.g., on sidelink. The transmitting device 410 may comprise a UE, a base station, an RSU, etc. The receiving device may comprise a UE, a base station, an RSU, etc.

IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 410. These soft decisions may be based on channel estimates computed by the channel estimator 458. The soft decisions are then decoded and deinterleaved to recover the data and control signals that were originally transmitted by the device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the device 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing to recover IP packets from the device 450. IP packets from the controller/processor 475 may be provided to the EPC 160. The controller/processor 475 is also responsible for error detection using an ACK and/or NACK protocol to support HARQ operations.

At least one of the TX processor 416, the RX processor 470, or the controller/processor 475 of device 410, or at least one of the TX processor 468, the RX processor 456, or the controller/processor 459 of device 450, may be configured to perform aspects described in connection with AGC component 198 of FIG. 1.

Generally, in sidelink communications, first wireless communication device 410 (e.g., a Tx UE) initially achieves sidelink synchronization with second wireless communication device 450 (e.g., a Rx UE). Following synchronization, the Tx UE may obtain an allocation of time-frequency resources, e.g., one or more slots, RBs, or subchannels in a resource pool, in which to transmit sidelink data to the Rx UE. Typically, the resource allocation may be scheduled by a base station in downlink control information (DCI) (in a mode 1 resource allocation), or the resource allocation may be determined through a sensing procedure conducted autonomously by the Tx UE (in a mode 2 resource allocation). After determining the resources, the Tx UE may send sidelink control information (SCI) including the resource allocation in a physical sidelink control channel (PSCCH) to the Rx UE. The Tx UE may transmit the SCI in two stages, including a first-stage SCI carried on PSCCH, and a second-stage SCI carried on a physical sidelink shared channel (PSSCH). First-stage SCI may contain information about the resource allocation (e.g., a frequency domain resource allocation (FDRA) and a time domain resource allocation (TDRA) indicating the sub-channel(s) and slot(s) which are reserved for the sidelink data transmission), while second-stage SCI may carry information for identifying and decoding the sidelink data (e.g., a modulation and coding scheme (MCS), and the source identifier (source ID) and destination identifier (destination ID) of a sidelink packet carried in the PSSCH). The Tx UE may transmit the sidelink data in the PSSCH to the Rx UE in the allocated resources.

Upon receiving the sidelink transmission, the Rx UE may attempt to blindly decode the PSCCH in all of the allocated subchannels of the resource pool. If the Rx UE successfully decodes the PSCCH, the UE may also attempt to decode the PSSCH scheduled by the PSCCH for the sidelink data. Depending on the decoding result, the Rx UE may provide hybrid automatic repeat request (HARQ) acknowledgment/negative acknowledgment (ACK/NACK) feedback to the Tx UE in a physical sidelink feedback channel (PSFCH). For example, if the Rx UE failed to decode the sidelink data, the UE may provide NACK to the Tx UE, while if the Rx UE successfully decoded the sidelink data, the UE may provide ACK to the Tx UE. If the Tx UE receives NACK from the Rx UE, the Tx UE may retransmit the sidelink data. Otherwise, if the Tx UE receives ACK from the Rx UE, the Tx UE may transmit new data to the Rx UE, or transmit data to a different Rx UE.

Figure 5A:
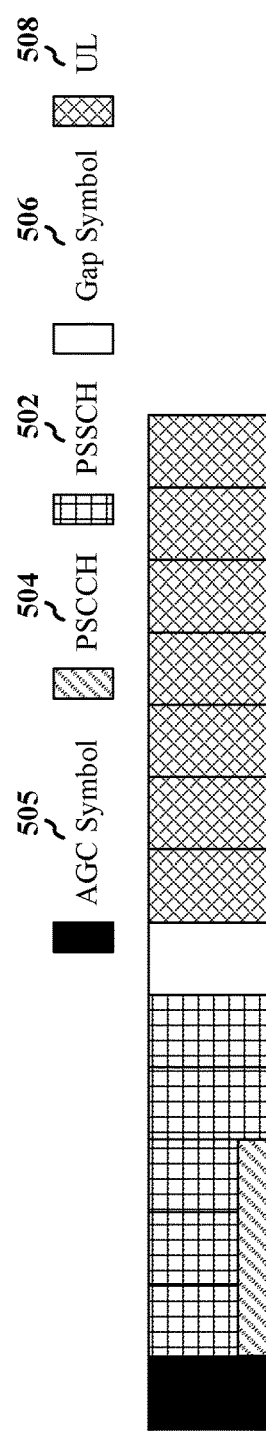
FIGS. 5A-5C are diagrams illustrating examples of sidelink slot structures.
Figure 5B:
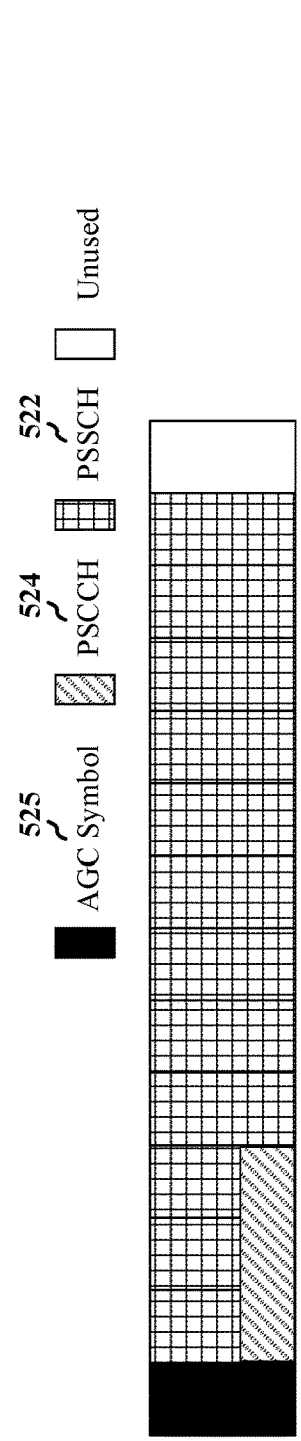
Figure 5C:
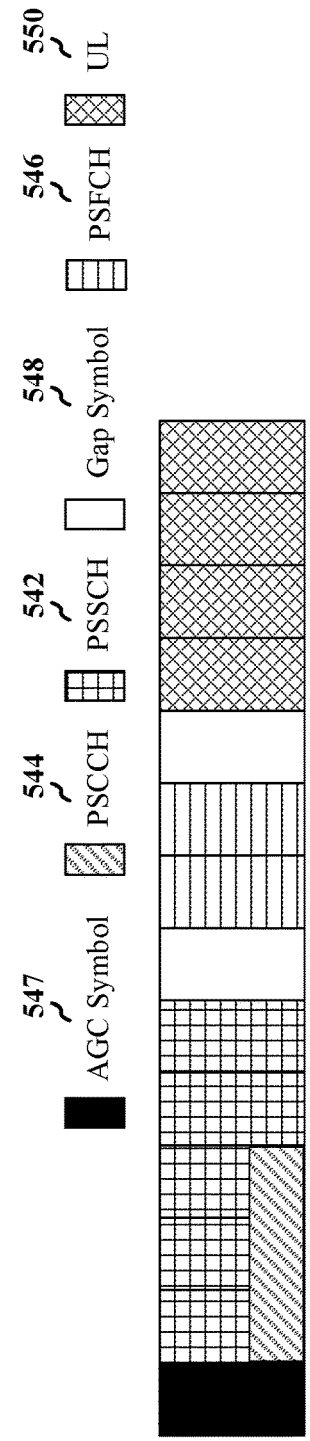

FIGS. 5A-5C illustrate different examples of slots 500, 520, 540 carrying sidelink data in PSSCH 502, 522, 542 from a Tx UE to a Rx UE. In addition to the PSSCH 502, 522, 542, slots 500, 520, 540 may include a PSCCH 504, 524, 544 carrying first-stage SCI, and optionally a PSFCH 546 for carrying HARQ feedback (ACK/NACK) from the Rx UE. The slot may also include other data besides the information carried in PSSCH 502, 522, 542, PSCCH 504, 524, 544, and PSFCH 546, including, for example, an AGC symbol 505, 525, 547 (e.g., which allows a Rx UE to set AGC as described below with respect to FIG. 8), gap symbols 506, 548 (e.g., for allowing Rx UEs to switch beams or to switch from being an Rx UE to being a Tx UE), uplink data 508, 550 (e.g., transmitted to a base station), or downlink data (e.g., received from a base station). The PSSCH may occupy at least 1 sub-channel and contain second-stage SCI. The PSCCH 504, 524, 544 may be multiplexed with the PSSCH 502, 522, 542 in various time-frequency resources within slot 500, 520, 540. While FIGS. 5A-5C illustrate particular example configurations for PSSCH, PSCCH, and PSFCH, in other examples, PSSCH, PSCCH, or PSFCH may be configured differently.

Sidelink slots (e.g., slots 500, 520, 540) contain OFDM symbols that can be used for sidelink communication. A UE may receive a configuration (e.g., an RRC configuration, DCI, or other configuration) indicating the symbol index of a first symbol (e.g., in a parameter sl-StartSymbol or some other name) and a symbol length (number of consecutive symbols, e.g., in a parameter sl-LengthSymbols or some other name) for sidelink communication within a sidelink slot. Generally, the first symbol for sidelink communication configured in a sidelink slot is an AGC symbol (e.g., AGC symbol 505, 525, 547), while the second and subsequent sidelink symbols carry PSSCH (e.g., PSSCH 502, 522, 542). Typically, such as illustrated in FIGS. 5A-5C, the PSSCH may be anywhere from 5 to 12 symbols in length, and the PSCCH (e.g., PSCCH 504, 524, 544) which is frequency division multiplexed with the PSSCH beginning with the second sidelink symbol of the slot, may be 2 or 3 symbols in length. For instance, FIG. 5A illustrates an example sidelink slot having a start symbol index of 0 and a symbol length of 7, and FIG. 5B illustrates an example sidelink slot having a start symbol index of 0 and a symbol length of 14. Moreover, other symbols of a slot (e.g., the remaining symbols of the slot which are not configured as sidelink within the RRC configuration) may be gap symbols (e.g., gap symbols 506, 548), PSFCH (e.g., PSFCH 546), or DL/UL (e.g., uplink data 508, 550). For instance, FIG. 5C illustrates an example sidelink slot having a start symbol index of 0 and a symbol length of 10, as well as a two-symbol PSFCH. In sidelink slots containing PSFCH, the first symbol of PSFCH may also be an AGC symbol.

Sidelink slots (e.g., slots 500, 520, 540) may also include mini-slots such as those applied in access network communication (e.g., over a Uu interface). Mini-slots generally include any number of symbols less than that of a slot (for example, 2, 4, 7 or other number of OFDM symbols). The location of a mini-slot within a slot for access network communication may depend on the configuration of a UE-specific search space for receiving a PDCCH. For instance, if a UE-specific search space is configured such that PDCCH may be received anywhere in a slot, a mini-slot may similarly be configured anywhere within the slot. Generally, a base station may configure mini-slots for access network communication to reduce communication latency and result in more efficient resource utilization (e.g., through transmission of small amounts of data). Similarly, a sidelink slot may be segmented into mini-slots to similarly reduce latency and result in more efficient resource utilization in sidelink communication. For example, similar to sidelink slots, a UE may receive a configuration (e.g., an RRC configuration, DCI, or other configuration) indicating the symbol index of a first symbol (e.g., in a parameter sl-StartSymbol or some other name) and a symbol length (number of consecutive symbols, e.g., in a parameter sl-LengthSymbols or some other name) for sidelink communication within each sidelink mini-slot of a given sidelink slot.

Figure 6A:
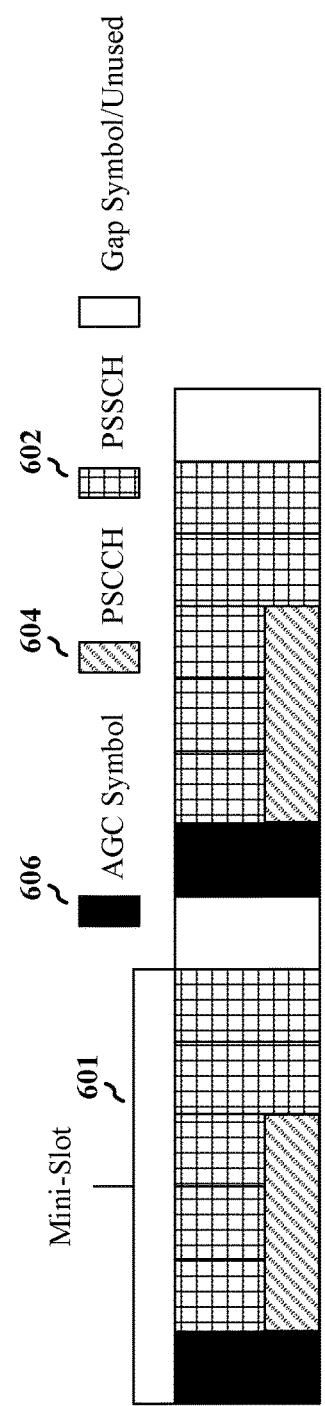
FIGS. 6A-6C are diagrams illustrating examples of sidelink mini-slot structures.
Figure 6B:
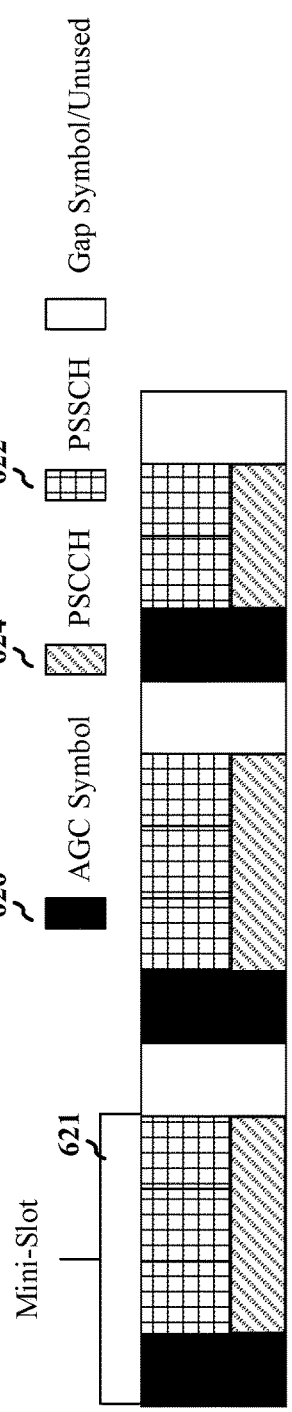
Figure 6C:
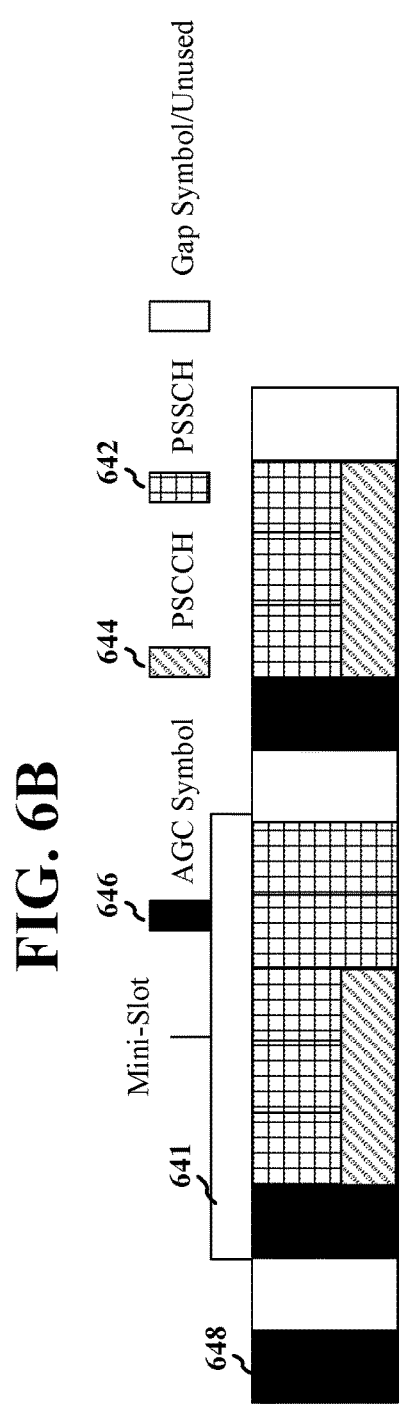

FIGS. 6A-6C illustrate examples of slots 600, 620, 640 including mini-slots 601, 621, 641 each carrying sidelink data in PSSCH 602, 622, 642 from a Tx UE to a Rx UE. Similar to the examples of FIGS. 5A-5C, in addition to the PSSCH 602, 622, 642, mini-slots 601, 621, 641 may each include a PSCCH 604, 624, 644 carrying SCI and multiplexed with the PSSCH, and optionally a PSFCH for carrying HARQ feedback (ACK/NACK) from the Rx UE. Each mini-slot may similarly include other data besides the information carried in PSSCH 602, 622, 642, PSCCH 604, 624, 644, and PSFCH, including, for example, an AGC symbol 606, 626, 646, a gap symbol, or uplink data/downlink data. While FIGS. 6A-6B illustrate particular example configurations of mini-slots (e.g., a slot including two mini-slots each including a three-symbol PSCCH as in FIG. 6A or three mini-slots each including a two-symbol PSCCH or a three-symbol PSCCH as in FIG. 6B), in other examples, the sidelink mini-slot structures may be configured differently. For example, FIG. 6C illustrates an example configuration of two mini-slots following an initial AGC symbol 648 for the slot 640. A gap symbol separates the initial AGC symbol 648 from the first mini-slot (e.g., mini-slot 601). The Tx UE may transmit the initial AGC symbol 648 prior to transmitting a mini-slot in slot 640 in order to allow an Rx UE receiving the slot 640 to successfully perform AGC if the Rx UE simultaneously receives a sidelink slot (e.g., slot 500, 520, 540) from another Tx UE. More details with respect to AGC symbols are described below with respect to FIG. 8.

Thus, similar to slots, mini-slots (e.g., mini-slots 601, 621, 641) may each contain their own SCI (e.g., first-stage SCI and second-stage SCI) and begin with their own AGC symbol (e.g., AGC symbol 606, 626, 646), thereby allowing a Rx UE for that mini-slot to set AGC and successfully decode sidelink data in that mini-slot. A gap symbol may be present between consecutive mini-slots to allow for a Tx UE or an Rx UE to switch beams, to switch between being an Rx UE and a Tx UE, or to switch between different Rx UEs or Tx UEs for different mini-slots. As a result, a Tx UE may transmit sidelink data within a portion of a slot (a mini-slot) to an Rx UE, rather than within the entire slot, thereby resulting in reduced communication latency and more efficient resource utilization. Moreover, a UE may transmit sidelink data in multiple mini-slots to different UEs, or may receive sidelink data in multiple mini-slots from different UEs, within the same slot.

Resource allocation for sidelink transmissions may be performed under different modes. In one mode (mode 1 resource allocation), the base station may provide a DCI that assigns the Tx UE the resources for sidelink communications. For example, the DCI may have the DCI format 3_0, which may indicate a resource pool index identifying a Tx resource pool for a sidelink communication among other information. In another mode (mode 2 resource allocation), the Tx UE autonomously decides the resources for sidelink communication. The Rx UE may receive sidelink communications from the Tx UE in the configured resource allocation similarly in either mode. The resource allocation indicated in DCI or autonomously determined by the Tx UE may be for a sidelink slot (e.g., slot 500, 520, 540) or a sidelink mini-slot (e.g., mini-slot 601, 621, 641).

Figure 7:
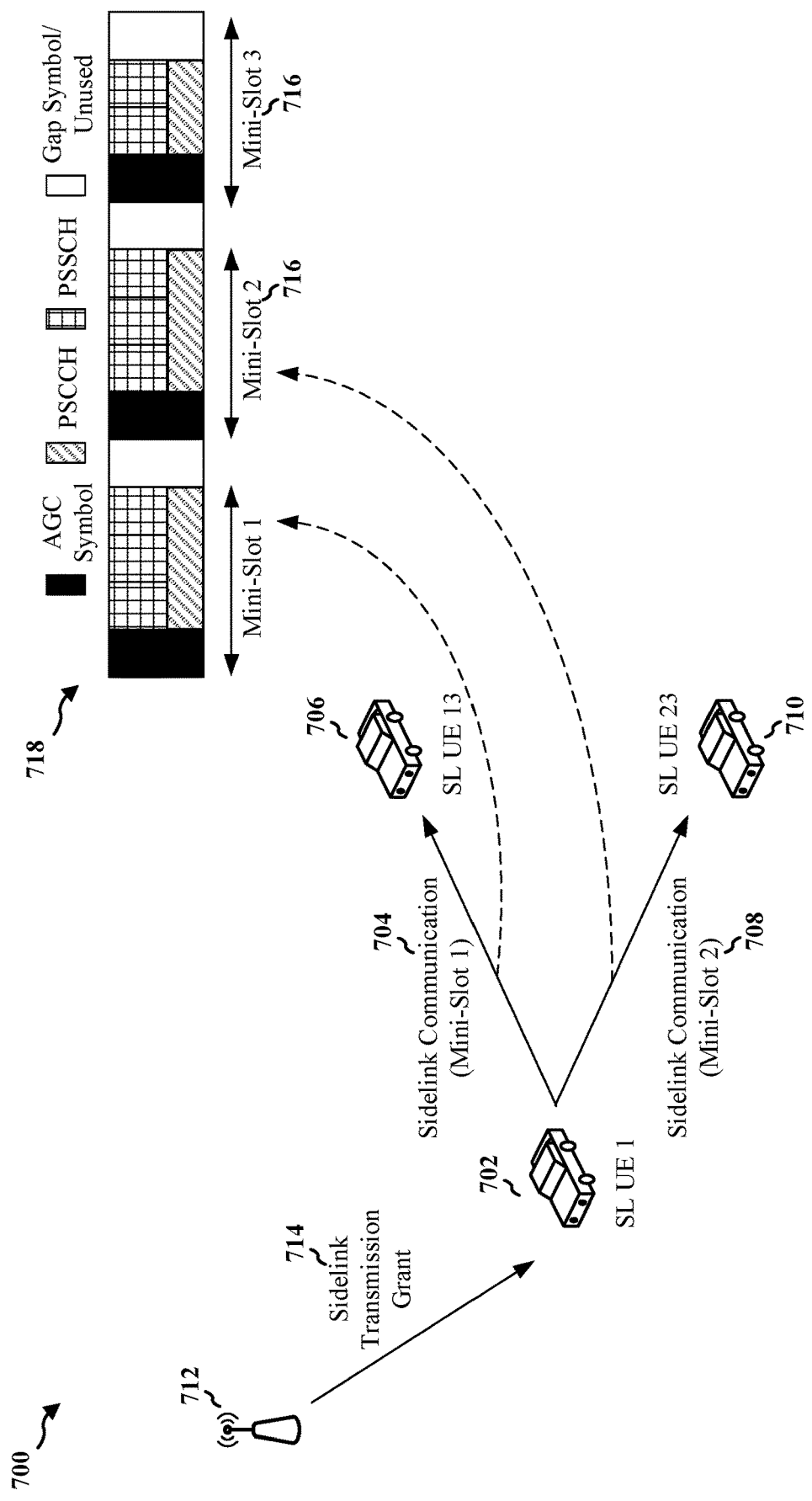
FIG. 7 is a diagram illustrating an example of a Tx UE which sends sidelink communications in different mini-slots to different Rx UEs.

FIG. 7 illustrates an example 700 of a Tx UE 702 that provides a first sidelink communication 704 to a first Rx UE 706 and a second sidelink communication 708 to a second Rx UE 710. Here, the Tx UE 702 may have a source identifier (ID) 1, the first Rx UE 706 may have a destination ID 13, and the second Rx UE 710 may have a destination ID 23, although the UEs may have different IDs in other examples. In this example of mode 1 resource allocation, a base station 712 may provide a sidelink transmission grant 714 to the Tx UE 702 indicating the resource allocation for sidelink communications 704, 708. The sidelink transmission grant 714 may be, for example, a DCI or a RRC configuration indicating the time-frequency resources for a plurality of mini-slots 716 in a slot 718. For instance, in the illustrated example, slot 718 may be configured to have three mini-slots such as in the example of FIG. 6B. After obtaining the resource allocation, the Tx UE 702 provides the sidelink communications 704 to the Rx UEs 706, 710 in the allocated resources. For instance, in the example of FIG. 7, the Tx UE 702 may provide first sidelink communication 704 to first Rx UE 706 in mini-slot 1 and second sidelink communication 708 to second Rx UE 710 in mini-slot 2.

As previously described, when a Tx UE sends a sidelink communication in a slot (e.g., slot 500, 520, 540) or a mini-slot (e.g., mini-slot 601, 621, 641, 716) to a Rx UE, the Tx UE transmits an AGC signal in an AGC symbol. The AGC signal allows an Rx UE to perform AGC on subsequent signals in order to increase the likelihood of successful decoding of the subsequent signal. For instance, in response to the AGC signal, the Rx UE may successfully adjust the gain of subsequent signals received into the UE's analog-to-digital converter (ADC) in order to prevent ADC range overflows or underflows that may prevent decoding of subsequent sidelink data from the Tx UE.

For example, an Rx UE may receive a sidelink communication (e.g., in mini-slot 601, 621, 641, 716) at the same time as interfering data from another Tx UE in a sidelink slot (e.g., in slot 500, 520, 540), which combined Rx power may result in an ADC range overflow. To prevent this ADC range overflow from impacting sidelink data decoding, if the Rx UE determines that the combined AGC signal from the Tx UE and another UE does not lie within the range of the Rx UE's ADC, the Rx UE may adjust the gain of subsequent sidelink data signals received from the Tx UE in order to fit within the range of the ADC. For instance, the Rx UE may reduce the gain of subsequent PSCCH and PSSCH based on a measured reference signal receive power (RSRP) of the combined AGC signal. In this way, when the Rx UE receives subsequent sidelink data from the Tx UE at the same time as the interfering signal from the other UE, the Rx UE may digitally filter out the interfering signal and successfully decode the sidelink communication from the Tx UE since ADC overflows may no longer occur.

Figure 8:
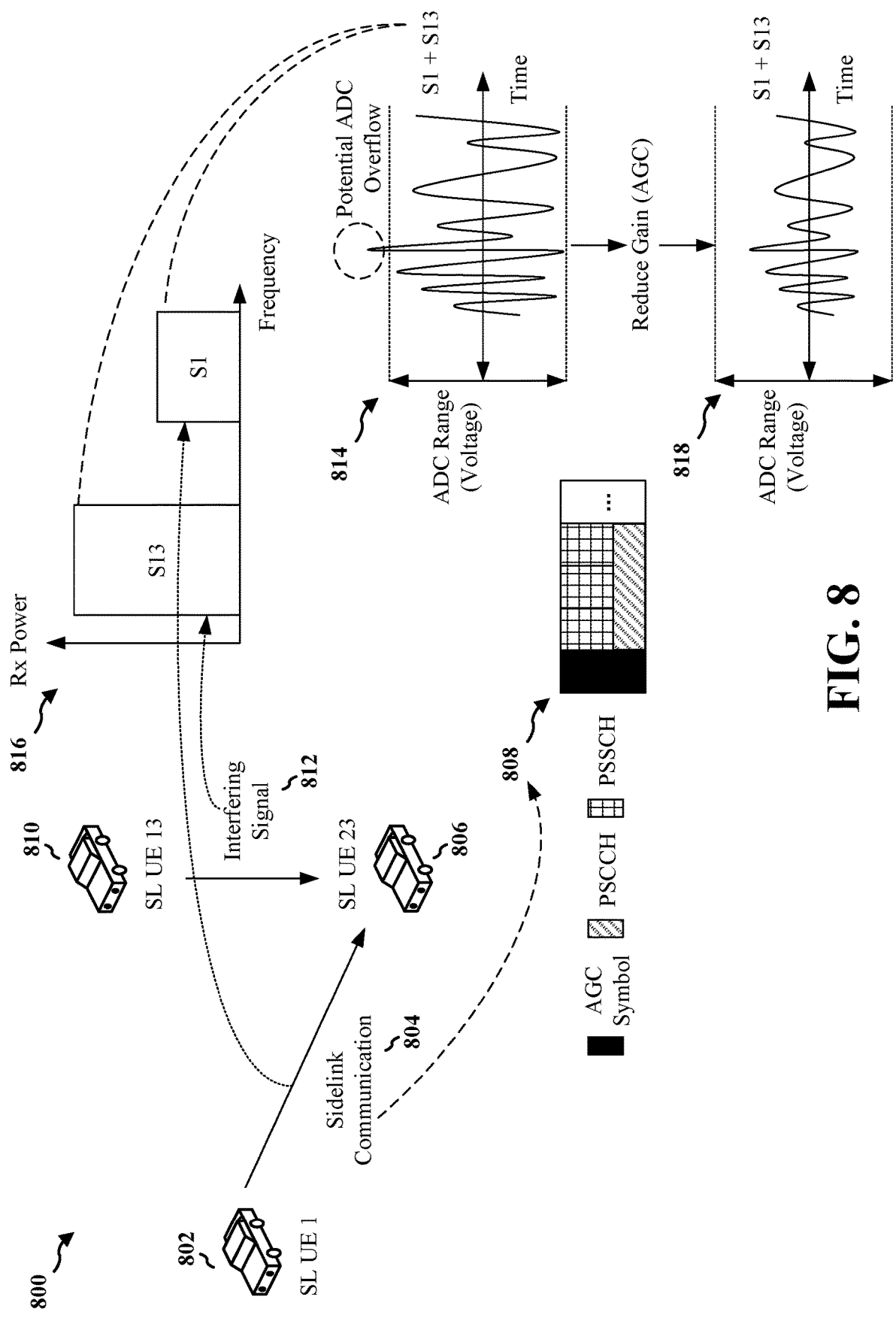
FIG. 8 is a diagram illustrating an example of a Rx UE setting AGC in response to an AGC signal in a sidelink communication.

FIG. 8 illustrates an example 800 of AGC. Similar to the example of FIG. 7, a Tx UE 802 may provide a sidelink communication 804 to a Rx UE 806 in a mini-slot 808 (e.g., mini-slot 2). However, in this example, another UE 810 may transmit an interfering signal 812 at the same time as sidelink communication 804, which when simultaneously received as a combined signal by Rx UE 806, may result in an ADC range overflow as illustrated in chart 814. For instance, referring to chart 816, the AGC signal (referred to as S1 in this example) from the Tx UE, and the interfering signal (referred to as S13 in this example) from the other UE, may together have a combined Rx power which exceeds the ADC range of the Rx UE depicted in chart 814. To prevent this ADC range overflow from impacting sidelink data decoding, after the Rx UE receives the AGC signal indicating this combined Rx power, the Rx UE may perform AGC so that the gain of subsequent signals may fit within its ADC range, such as illustrated in chart 818. As a result of this gain reduction, when the Rx UE later receives the PSCCH and PSSCH in the sidelink communication 804 from the Tx UE, the Rx power of the PSCCH and PSSCH in combination with the Rx power of the interfering signal 812 may no longer exceed the ADC range, and therefore the Rx UE may digitally filter out the interfering signal (e.g., S13) and successfully decode the PSCCH and PSSCH.

The Tx UE may transmit an AGC signal in an AGC symbol (e.g., AGC symbol 606, 626, 646) in order to allow Rx UEs to adjust AGC on a transmission-by-transmission basis (e.g., in every slot or mini-slot containing that AGC symbol). For instance, a Tx UE may estimate a total Rx power of a sidelink communication which is to be transmitted to the Rx UE, and the Tx UE may transmit an AGC signal including this estimated Rx power in an AGC symbol (e.g., AGC symbol 505, 525, 547, 606, 626, 646) of a slot (e.g., slot 500, 520, 540) or mini-slot (e.g., mini-slot 601, 621, 641, 716) including this sidelink communication. The Rx UE may measure the RSRP of the AGC signal in the AGC symbol, and perform AGC accordingly for the sidelink communication. This process may repeat for each AGC symbol in each sidelink communication (e.g., during every sidelink slot or mini-slot). So long as the AGC symbol is within the same frequency range as the subsequent PSSCH and the transmission power of the AGC symbol is the same as the transmission power of the PSSCH, the frequency domain location and bandwidth of the AGC symbol are irrelevant for the purpose of setting AGC.

Figure 9:
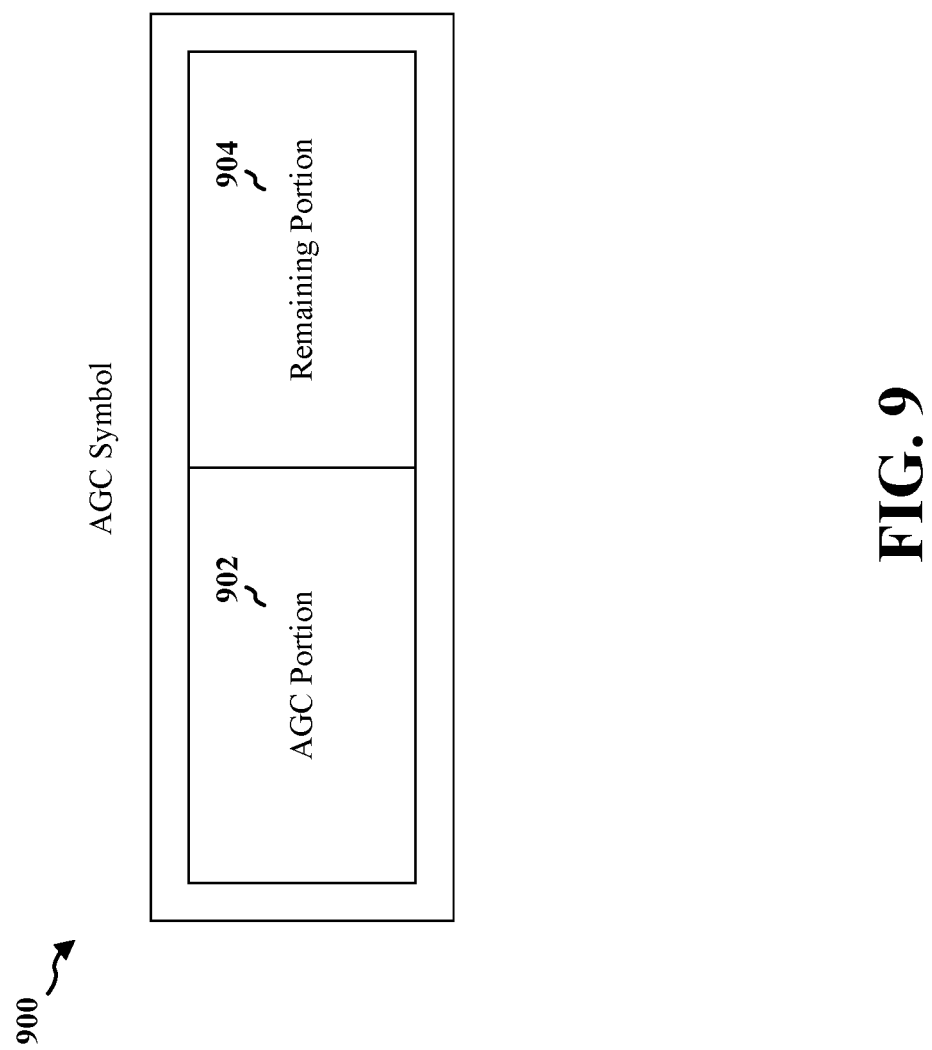
FIG. 9 is a diagram illustrating an example of an AGC symbol in a sidelink communication.

FIG. 9 illustrates an example of an AGC symbol 900 (e.g., AGC symbol 505, 525, 547, 606, 626, 646). Generally, the Rx UE measures a number of samples of the AGC signal over a given amount of time, referred to as an AGC portion 902 of AGC symbol 900, calculates an average Rx power from the samples, and sets AGC based on the average Rx power. This given amount of time may be less than the symbol length (e.g., half) of the AGC symbol, for example, ~4.45 μs in one OFDM symbol spanning ~8.9 μs at 120 kHz subcarrier spacing. As a result, during remaining portion 904 of the AGC symbol, the Rx UE may perform some other action than AGC signal sampling. For instance, since the data in AGC symbol 900 is conventionally a copy of the data in the second symbol of a sidelink slot (e.g., multiplexed PSCCH and PSSCH), the Rx UE may spend the remaining portion 904 of the AGC symbol attempting to advance decode the PSCCH and PSSCH of the sidelink communication from the duplicated data. Alternatively, the Rx UE may disregard the remaining portion, or otherwise act according to a different configured implementation of the Rx UE.

Currently, in response to receiving a sidelink communication including an AGC symbol for setting AGC, first-stage SCI including a resource allocation for PSCCH, and second-stage SCI including destination IDs and other information for PSSCH, the Rx UE may identify whether a received sidelink slot or mini-slot is intended for the Rx UE. If the Rx UE is identified to be the target Rx UE for that sidelink communication, the Rx UE may successfully decode the sidelink data in the allocated resources. However, as the Rx UE may not ascertain whether a slot or mini-slot is intended for that Rx UE prior to decoding the PSSCH, the Rx UE blindly monitors for and processes the SCIs in each sidelink communication that it receives. Such blind monitoring and processing may take significant power and time. Moreover, when a sidelink communication includes multiple mini-slots, and thus multiple instances of SCIs for potentially different UEs, the amount of time and power involved in the monitoring and processing may be further increased. Thus, it would be helpful to allow Rx UEs to more efficiently monitor and process received sidelink communications from Tx UEs.

Accordingly, aspects of the present disclosure allow a Tx UE to leverage the remaining portion of the AGC symbol, or to otherwise indicate by the AGC symbol, the target Rx UE of a sidelink communication in order to reduce the monitoring and processing time of the Rx UE. For instance, a Tx UE may indicate a target Rx UE for a sidelink communication in an AGC symbol based on an RB which contains the AGC symbol. As a result, an Rx UE which determines from the AGC symbol that it is not the target of the sidelink communication including that AGC symbol, may refrain from monitoring for and processing the SCI in that sidelink communication and thereby save significant monitoring and processing time. For example, rather than decoding each SCI in every mini-slot of a sidelink slot to determine whether the mini-slot contains sidelink data intended for an Rx UE, the Rx UE may more quickly and efficiently determine this information from each AGC symbol and refrain from decoding SCIs not intended for that Rx UE in response to the information in the AGC symbol, thereby conserving use of power and time.

In one example, a Tx UE may transmit the AGC symbol in a single RB. The RB may be one of multiple RBs in a Tx resource pool (e.g., configured in DCI, an RRC configuration, or other configuration), or the RB may be one of multiple RBs in a designated set of RBs larger than the Tx resource pool. In a similar manner to how RBs are designated for PSFCH (e.g., in a RRC parameter sl-PSFCH-RB-Set or another name), the designated set of RBs here may be designated for identifying target Rx UEs using AGC signals (for example, in a different RRC parameter for this purpose).

In one example, the location of the RB may be based on the ID of the target Rx UE. For instance, the frequency domain location of the RB may be configured based on a hash or other function of the target Rx UE ID. For example, the Tx UE may transmit an AGC signal associated with a sidelink communication intended for a Rx UE in the RB identified by the following function:

$$\text{Rx UE ID modulus } N \quad (1)$$

where Rx UE ID represents the destination ID of the target Rx UE for the sidelink communication, and N represents the number of RBs in the Tx resource pool or designated set of RBs. Thus, if the Tx resource pool or the designated set of RBs includes N=11 RBs (respectively having RB IDs 0-10), and if the Tx UE intends to transmit a sidelink communication to SL UE 13, then by applying the function (1) above, the Tx UE and Rx UE may respectively calculate RB 2 (13 mod 11=2) as the RB in which the AGC signal associated with that sidelink communication is to be transmitted or received. Similarly, if the Tx UE intends to transmit another sidelink communication to SL UE 23, then by applying the function (1) above, the Tx UE and Rx UE may respectively calculate RB 1 (23 mod 11=1) as the RB in which the AGC signal associated with that other sidelink communication is to be transmitted or received. It should be noted that function (1) here is merely an example; in other examples, the Rx UE and Tx UE may determine the RB for the AGC signal based on some other function of the Rx UE ID. Regardless of how the RB ID is calculated, the Tx UE may transmit the AGC signal in a single RB associated with that ID for example, according to PUCCH format 0, similar to how an Rx UE transmits PSFCH, since PUCCH format 0 may occupy a single RB.

In a similar example, the location of the RB may be based on the ID of both the target Rx UE and the Tx UE. For instance, the Tx UE may transmit an AGC signal associated with a sidelink communication intended for a Rx UE in an RB identified by the following function:

$$(\text{Tx UE ID}+\text{Rx UE ID})\text{modulus } N \quad (2)$$

where Tx UE ID represents the source ID of the Tx UE ID for the sidelink communication, Rx UE ID represents the destination ID of the target Rx UE for the sidelink communication, and N represents the number of RBs in the Tx resource pool or designated set of RBs. Thus, if the Tx resource pool or the designated set of RBs includes N=11 RBs (respectively having RB IDs 0-10), and if SL UE 1 intends to transmit a sidelink communication to SL UE 13, then by applying the function (2) above, the Tx UE and Rx UE may respectively calculate RB 3 ((1+13=14) mod 11=3) as the RB in which the AGC signal associated with that sidelink communication is to be transmitted or received. Similarly, if SL UE 1 intends to transmit another sidelink communication to SL UE 23, then by applying the function (2) above, the Tx UE and Rx UE may respectively calculate RB 2 ((1+23=24) mod 11=2) as the RB in which the AGC signal associated with that other sidelink communication is to be transmitted or received. It should be noted that function (2) here is merely an example; in other examples, the Rx UE and Tx UE may determine the RB for the AGC signal based on some other function of the Tx UE ID and Rx UE ID.

When a Rx UE receives a sidelink communication from a Tx UE, the Rx UE ID may sense power (e.g., RSRP) in the RB corresponding to its ID (e.g., based on function (1) or (2) above or some other function). The Rx UE may sense this power during the AGC symbol in order to determine whether the sidelink communication including that AGC symbol is intended for that Rx UE. If the Rx UE determines that the sensed power in the corresponding RB exceeds a given threshold (e.g., an RSRP threshold), the Rx UE may ascertain the accompanying PSCCH and PSSCH in the slot or mini-slot including that AGC symbol is intended for that Rx UE. Otherwise (e.g., if the Rx UE does not sense power in that RB), the Rx UE may conclude that the sidelink communication is not intended for that UE, and refrain from decoding the PSCCH and PSSCH accordingly. For example, an Rx UE having ID 13, which senses power in RB 2 during the AGC symbol, may determine based on the function (1) that the sidelink communication including that AGC signal is intended for that UE, and therefore the Rx UE may assume the remaining symbols of that sidelink communication are intended for that UE and proceed to decode the PSCCH and PSSCH in that sidelink communication accordingly. In contrast, an Rx UE having a different ID may determine that the sidelink communication is not intended for that UE and therefore may refrain from decoding the PSCCH and PSSCH in that sidelink communication.

Figure 10:
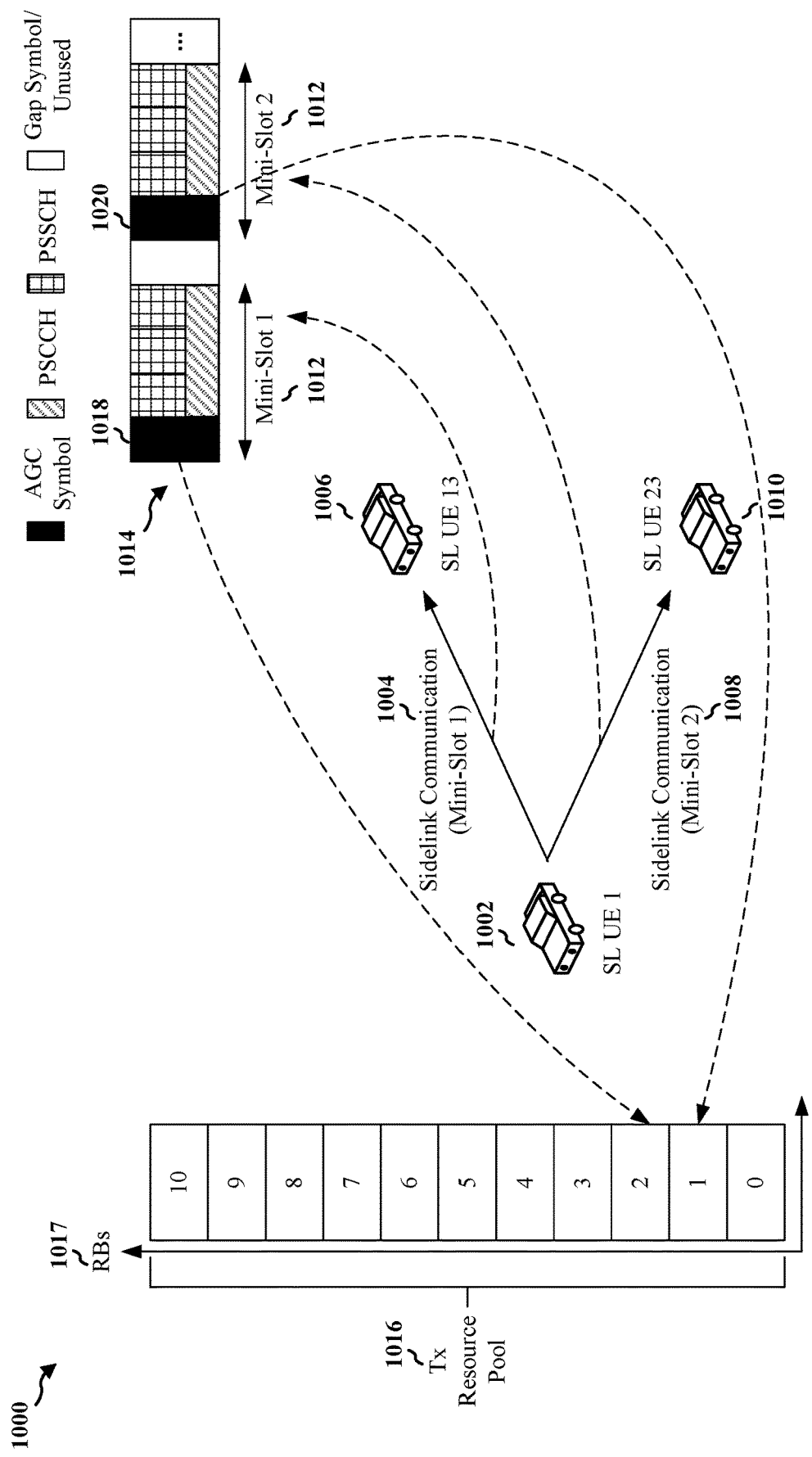
FIG. 10 is a diagram illustrating an example of sidelink communications having a mini-slot structure with respective AGC symbols, where each AGC symbol indicates a respective Rx UE based on an RB carrying the AGC symbol.

FIG. 10 illustrates an example 1000 of a Tx UE 1002 that provides a first sidelink communication 1004 to a first Rx UE 1006 and a second sidelink communication 1008 to a second Rx UE 1010. Similar to the example of FIG. 7, the Tx UE 1002 may have a source identifier (ID) 1, the first Rx UE 1006 may have a destination ID 13, and the second Rx UE 1010 may have a destination ID 23, although the UEs may have different IDs in other examples. Also similar to the example of FIG. 7, the Tx UE 1002 may provide the sidelink communications 1004, 1008 to the Rx UEs 1006, 1010 in different ones of a plurality of mini-slots 1012 in a slot 1014. For instance, in the illustrated example, slot 1014 may be configured to have three mini-slots such as in the examples of FIGS. 6B and 7, and the Tx UE 1002 may provide first sidelink communication 1004 to first Rx UE 1006 in mini-slot 1 and second sidelink communication 1008 to second Rx UE 1010 in mini-slot 2.

In this example 1000, a Tx resource pool 1016 of RBs 1017 may be configured for the sidelink communications 1004, 1008. While the number of RBs 1017 in this example is 11 RBs (e.g. N=11), in other examples the number of RBs may be different. In order to allow the first Rx UE 1006 and the second Rx UE 1010 to save processing power and time in decoding mini-slots 1012 for their respective sidelink communications, the Tx UE 1002 may transmit an AGC signal (e.g., signal S1 of FIG. 8) in AGC symbol 1018 for mini-slot 1 within RB 2 and another AGC signal in AGC symbol 1020 for mini-slot 2 within RB 1, such as illustrated in FIG. 10. For example, based on function (1) above, the Tx UE 1002 may determine to transmit the AGC symbol 1018 in RB 2 (e.g., since 13 mod 11=2) and to transmit the AGC symbol 1020 in RB 1 (e.g., since 23 mod 11=1). As a result, during AGC symbol 1018, first Rx UE 1006 may determine to decode PSCCH and PSSCH in mini-slot 1 in response to sensing power in RB 2, while during AGC symbol 1020, first Rx UE 1006 may refrain from decoding PSCCH and PSSCH in mini-slot 2 due to a lack of sensed power in RB 2 or in response to sensing power in a different RB or frequency domain location than RB 2. Similarly, during AGC symbol 1018, second Rx UE 1010 may refrain from decoding PSCCH and PSSCH in mini-slot 1 due to a lack of sensed power in RB 1 or in response to sensing power in a different RB or frequency domain location than RB 1, while during AGC symbol 1020, second Rx UE 1010 may determine to decode PSCCH and PSSCH in mini-slot 2 in response to sensing power in RB 1.

While the example of FIG. 10 refers to the AGC symbols being within RBs 1017 of Tx resource pool 1016, in other examples, the AGC symbols may be within a designated set of RBs configured for the Tx UE to indicate target Rx UEs of respective sidelink communications. For instance, in the example of FIG. 10 where Tx resource pool 1016 includes 11 RBs, the application of function (1) above would allow separation of AGC signals only between 11 Rx UEs (e.g., Rx UEs 0-10). If more Rx UEs than RBs in the Tx resource pool are present, then multiple AGC signals for different sidelink communications may be carried within a same RB, resulting in possible collisions. For instance, if SL UE 1 intends to transmit mini-slot 1 to SL UE 13 as illustrated in FIG. 10, but alternatively intends to transmit mini-slot 2 to SL UE 2 (rather than SL UE 23 as illustrated), the AGC symbols 1018, 1020 may both be within RB 2 based on function (1), since 13 mod 11=2 mod 11=2. As a result, collisions between signals in AGC symbols 1018, 1020 may result. Accordingly, to minimize the possibility of such collisions, a designated set of RBs larger than that of the Tx resource pool (and in some cases including one or more RBs of the Tx resource pool) may instead be applied. For instance, if the designated set of RBs is configured to include 14 RBs rather than 11 as in Tx resource pool 1016, the immediately aforementioned example would not result in a collision since AGC symbols 1018, 1020 would be within different RBs.

In one example, as described above with respect to FIGS. 6A, 6B, 7, and 10, the AGC symbol for each mini-slot may be within a different RB corresponding to the Rx UE ID (and optionally Tx UE ID). However, in some cases, such as described above with respect to FIG. 6C, a sidelink slot may be configured to include AGC symbol 648 preceding the sidelink mini-slots within the slot. For instance, if a Tx UE intends to transmit sidelink data in a mini-slot (e.g., mini-slot 641) to an Rx UE that may also receive sidelink data in a slot (e.g., 500, 520 540), the Tx UE may transmit an AGC signal prior to the mini-slot in AGC symbol 648. This AGC symbol may allow the Rx UE to successfully set AGC of subsequent sidelink mini-slots in the event the Rx UE simultaneously receives one sidelink communication in a slot (e.g., 500, 520 540) and another sidelink communication in a mini-slot (e.g., mini-slot 641). For instance, the Tx UE may estimate the combined Rx power of both sidelink communications at the Rx UE and transmit the AGC signal at this estimated power in the AGC symbol 648, and the Rx UE may set AGC accordingly such as described above with respect to FIG. 8.

In the aforementioned example where a sidelink communication includes an AGC symbol for a slot (e.g., AGC symbol 648 of FIG. 6C) and another AGC symbol for a mini-slot, the Tx UE may intend to transmit different sidelink communications in respective mini-slots of a slot to different Rx UEs. In such case, the Tx UE may indicate the identifiers of the target Rx UEs in the AGC symbol for the slot in respective RBs of a Tx resource pool or designated set of RBs similar to that described above with respect to FIG. 10. For example, if a Tx resource pool or designated set of N RBs is configured for AGC signals, the Tx UE may simultaneously transmit an AGC signal using PUCCH format 0 in each RB determined by the function (1) above for each Rx UE. Thus, the Tx UE may inform multiple Rx UEs via the corresponding RBs of the AGC symbol (e.g., AGC symbol 648) which Rx UEs are to receive sidelink data in one of multiple mini-slots following the AGC symbol. Moreover, to inform the Rx UEs via the AGC symbol 648 of which mini-slot of the multiple mini-slots is intended for a given Rx UE, each mini-slot in the slot may be associated with a respective orthogonal sequence (e.g., a slot including K mini-slots would include K orthogonal sequences), and each orthogonal sequence may correspond to a different cyclic shift of the PUCCH format 0 waveform. Thus, the Tx UE may inform the Rx UEs, via the sequence or cyclic shift applied in each corresponding RB of the AGC symbol, which mini-slot corresponds to which Rx UE.

Figure 11:
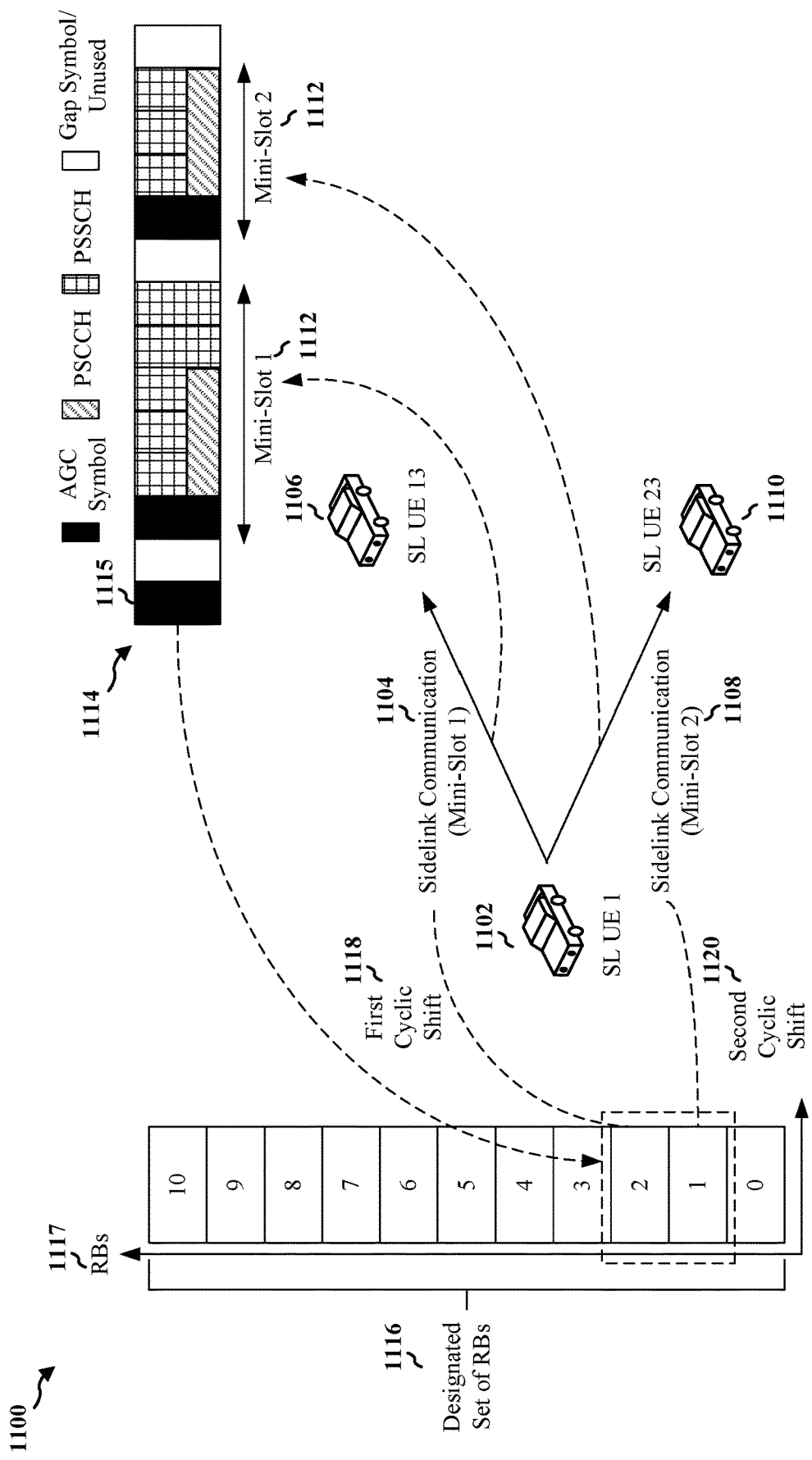
FIG. 11 is a diagram illustrating another example of sidelink communications having a mini-slot structure with respective AGC symbols, where a first AGC symbol of the slot indicates multiple Rx UEs for the sidelink communications based on the RBs carrying the AGC symbol.

FIG. 11 illustrates an example 1100 of a Tx UE 1102 that provides a first sidelink communication 1104 to a first Rx UE 1106 and a second sidelink communication 1108 to a second Rx UE 1110. Similar to the example of FIG. 10, the Tx UE 1102 may have a source identifier (ID) 1, the first Rx UE 1106 may have a destination ID 13, and the second Rx UE 1110 may have a destination ID 23, although the UEs may have different IDs in other examples. Also similar to the example of FIG. 10, the Tx UE 1102 may provide the sidelink communications 1104, 1108 to the Rx UEs 1106, 1110 in different ones of a plurality of mini-slots 1112 in a slot 1114. However, unlike the example of FIG. 10, here in this example the slot 1114 also includes an AGC symbol 1115 for the slot 1114 as well as AGC symbols for the mini-slots 1112. For instance, in the illustrated example, slot 1114 may be configured to have one AGC symbol for the slot and two mini-slots with their own AGC symbols such as in the example of FIG. 6C, and the Tx UE 1102 may provide first sidelink communication 1104 to first Rx UE 1106 in mini-slot 1 and second sidelink communication 1108 to second Rx UE 1110 in mini-slot 2.

In this example 1100, a designated set of RBs 1116 of RBs 1117 may be configured for the sidelink communications 1104, 1108, although a Tx resource pool may alternatively be configured in other examples such as illustrated in FIG. 10. While the number of RBs 1117 in this example is 11 RBs (e.g. N=11), in other examples the number of RBs may be different. In order to allow the first Rx UE 1106 and the second Rx UE 1110 to save processing power and time in decoding mini-slots 1112 for their respective sidelink communications, the Tx UE 1102 may transmit an AGC signal (e.g., signal S1 of FIG. 8) in the AGC symbol 1115 within RB 2 for SL UE 13 and within RB 1 for SL UE 23, such as illustrated in FIG. 11. For example, based on function (1) above, the Tx UE 1102 may determine to transmit the AGC symbol 1115 in RB 2 (e.g., since 13 mod 11=2) and in RB 1 (e.g., since 23 mod 11=1) to indicate that first Rx UE 1106 and second Rx UE 1110 are intended to receive one of the sidelink communications 1104, 1108. Moreover, in order to identify which sidelink communication 1104, 1108 is intended for which Rx UE, the Tx UE 1102 may apply a first cyclic shift 1118 (e.g., 0 or some other value) to a PUCCH format 0 sequence of the AGC signal within RB 2, and a second cyclic shift 1120 (e.g., 6 or some other different value) to a PUCCH format 0 sequence of the AGC signal within RB 1. In this example, the value of cyclic shift 1118 may be pre-configured (or configured) to be associated with mini-slot 1 (sidelink communication 1104), while the value of cyclic shift 1120 may be pre-configured (or configured) to be associated with mini-slot 2 (sidelink communication 1108). As a result, during AGC symbol 1115, first Rx UE 1106 may determine to decode PSCCH and PSSCH in mini-slot 1 but not mini-slot 2 in response to sensing power in RB 2 of an AGC signal including the first cyclic shift 1118, while the first Rx UE 1106 may refrain from decoding PSCCH and PSSCH due to a lack of sensed power in RB 2. Similarly, during AGC symbol 1115, second Rx UE 1110 may refrain from decoding PSCCH and PSSCH in mini-slot 1 due to a lack of sensed power in RB 1, while second Rx UE 1110 may determine to decode PSCCH and PSSCH in mini-slot 2 but not mini-slot 1 in response to sensing power in RB 1 of an AGC signal including the second cyclic shift 1120. Thus, during AGC symbol 1115, the Tx UE may indicate an ID of a target Rx UE for a sidelink mini-slot based on the frequency domain location of an RB carrying the AGC signal, and the Tx UE may indicate an index of the sidelink mini-slot intended for that target Rx UE based on the sequence or cyclic shift of the AGC signal carried in that RB.

Thus, rather than simply applying AGC symbols for purposes of setting AGC, the various aspects described throughout the present disclosure allow AGC symbols to be additionally (or alternatively) applied for identifying or indicating target Rx UEs of a sidelink communication. In this way, Rx UEs may save monitoring and processing power and time in receiving and decoding sidelink communications. This difference in application of AGC (e.g., between only setting AGC and indicating target Rx UEs) may be represented by different AGC modes indicated in a configuration from the base station (or Tx UE). For instance, a Tx UE and Rx UE may receive an RRC configuration, DCI, or other configuration including a flag or other parameter which indicates which AGC mode is to be applied. For example, one configured value may inform Tx UEs and Rx UEs of one AGC mode in which AGC symbols are to be duplicates of the second symbol of a sidelink communication and are to be applied only for setting AGC (not for identifying Rx UEs). In contrast, a different configured value may inform Tx UEs and Rx UEs of another AGC mode in which AGC symbols are not limited to being a duplicate of the second symbol of a sidelink communication and may be applied not only for setting AGC but also for identifying Rx UEs such as described above with respect to FIGS. 10 and 11. In this way, flexibility in use of AGC symbols for different purposes may be achieved.

Figure 12:
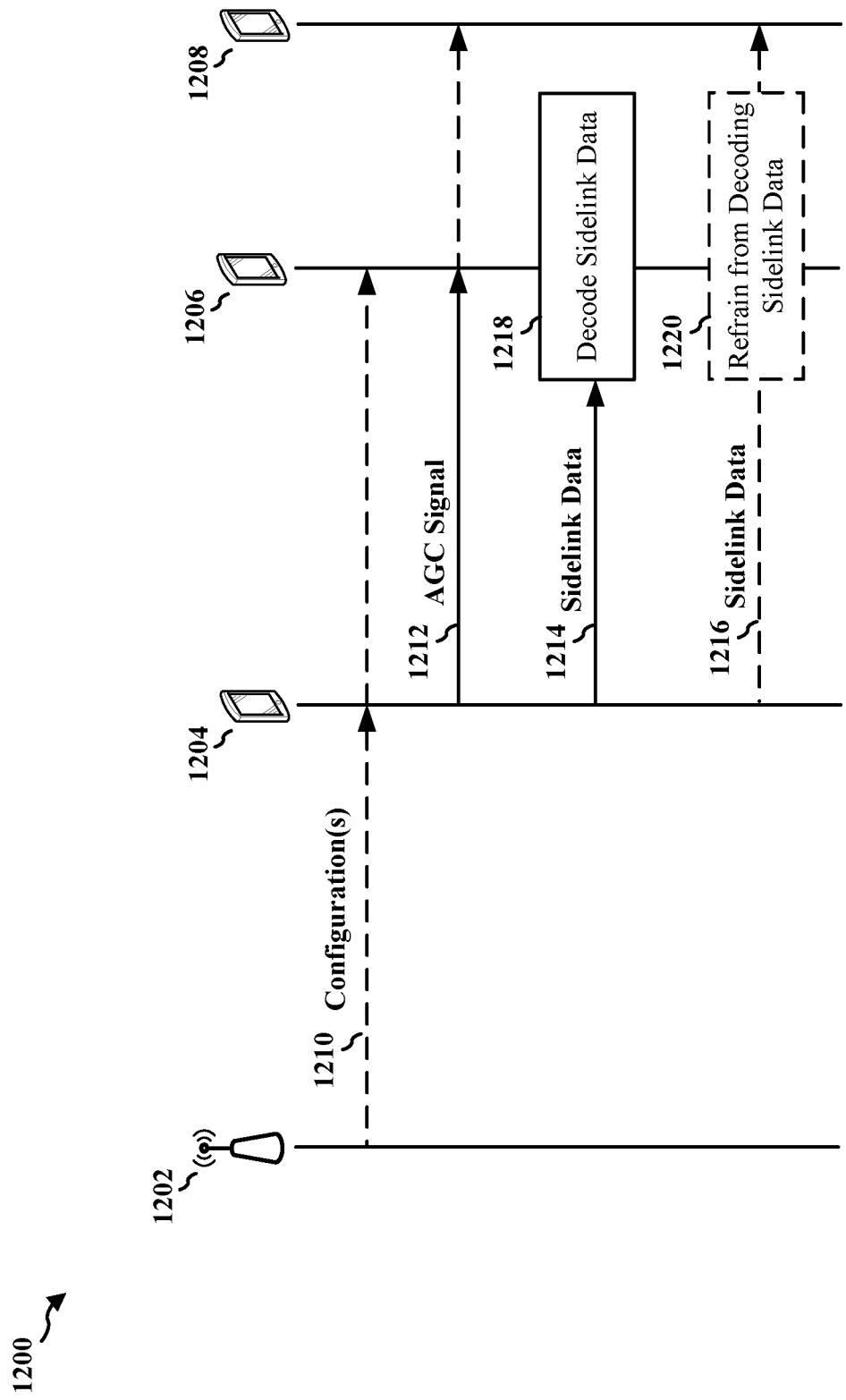
FIG. 12 is a diagram illustrating a call flow between a base station, a Tx UE, and multiple Rx UEs.

FIG. 12 is an example 1200 of a call flow between a base station 1202 (e.g., base station 102/180, 712), a Tx UE 1204 (e.g., first wireless communication device 410, Tx UE 702, 802, 1002, 1102), a first Rx UE 1206 (e.g., UE 104, second wireless communication device 450, first Rx UE 706, 1006, 1106, Rx UE 806), and a second Rx UE 1208 (e.g., UE 104, second wireless communication device 450, second Rx UE 710, 1010, 1110, Rx UE 806). In one example, base station 1202 may transmit one or more configuration(s) 1210 to the Tx UE 1204. In other examples, Tx UE 1204 may configure the configuration(s) 1210 (without receiving it or them from the base station). In some cases, base station 1202 may transmit configuration(s) 1210 to first Rx UE 1206 and/or second Rx UE 1208, while in other cases, Tx UE 1204 may transmit configuration(s) 1210 to first Rx UE 1206 and/or second Rx UE 1208.

Here, configurations(s) 1210 may, for example, be one or more RRC configurations, DCIs, or other configurations which indicate a first symbol, a symbol length for sidelink communication within a sidelink slot and/or for sidelink communication within each sidelink mini-slot of a given sidelink slot. Configuration(s) 1210 may, for example, be one or more RRC configurations, DCIs, or other configurations indicating the time-frequency resources for a plurality of mini-slots within a slot (e.g., sidelink transmission grant 714 of FIG. 7). Configuration(s) 1210 may, for example, be one or more RRC configurations, DCIs, or other configurations indicating a Tx resource pool or a designated set of RBs for identifying target Rx UEs using AGC signals. Configuration(s) 1210 may, for example, be one or more RRC configurations, DCIs, or other configurations indicating a function for determining RBs associated with target Rx UEs (e.g., functions (1) or (2)). Configuration(s) 1210 may, for example, be one or more RRC configurations, DCIs, or other configurations including a flag or other parameter which indicates an AGC mode that is to be applied for sidelink communications. Configuration(s) 1210 may include a combination of any of the aforementioned configurations.

Tx UE 1204 may transmit an AGC signal 1212 followed by sidelink data 1214, 1216 (e.g., PSSCH 502, 522, 542, 602, 622, 642 and/or PSCCH 504, 524, 544, 604, 624, 644) respectively to first Rx UE 1206 and/or second Rx UE 1208. For instance, Tx UE may transmit an AGC signal (e.g., signal S1 or a combined signal such as illustrated in chart 814 of FIG. 8) in an AGC symbol (e.g., AGC symbol 505, 525, 547, 606, 626, 646, 648, 900, 1018, 1020, 1115) within a slot (e.g., slot 500, 520, 540, 600, 620, 640, 718, 1014, 1114) or mini-slot (e.g., mini-slot 601, 621, 641, 716, 808, 1012, 1112) from which first Rx UE 1206 and/or second Rx UE 1208 may set AGC for receiving the sidelink data 1214, 1216 respectively. The AGC symbol or signal may include an RSRP or other measurement indicative of the power of the associated sidelink data from the Tx UE.

Tx UE 1204 may transmit AGC signal 1212 for first Rx UE 1206 in an RB (e.g., configured in the Tx resource pool or designated set of RBs) corresponding to an ID of the target Rx UE (and optionally the ID of the Tx UE), for example, based on function (1), function (2), or some other pre-configured or configured function. First Rx UE 1206 and/or second Rx UE 1208 receiving AGC signal 1212 may measure a number of samples of the AGC signal (e.g., during AGC portion 902 of AGC symbol 900), calculate a metric (e.g., average Rx power) from the samples, and set AGC in response to the calculated metric. First Rx UE 1206 and/or second Rx UE 1208 may also determine whether or not the sensed power in their corresponding RB exceeds the RSRP threshold, such as described above with respect to FIG. 10. For example, first Rx UE 1206 may sense power in its corresponding RB from the AGC signal 1212 during the slot or mini-slot containing sidelink data 1214, in response to which at block 1218, first Rx UE 1206 may proceed to decode the sidelink data 1214. In contrast, first Rx UE 1206 may not sense power in its corresponding RB from the AGC signal 1212 during the slot or mini-slot containing sidelink data 1216, in response to which at block 1220, first Rx UE 1206 may refrain from decoding the sidelink data 1216. Furthermore, in the example where the AGC symbol including AGC signal 1212 is received in a first symbol of a sidelink communication (e.g., AGC symbol 648, 1115), first Rx UE 1206 may further determine the cyclic shift (e.g., first cyclic shift 1118 or second cyclic shift 1120) of the sequence applied to that AGC signal, such as described above with respect to FIG. 11. In response to determining the cyclic shift applied in its corresponding RB, the first Rx UE may determine to decode whichever sidelink data 1214, 1216 is associated with the determined cyclic shift. For example, the first Rx UE may decode the sidelink data 1214 at block 1218 and refrain from decoding the sidelink data 1216 at block 1220 in response to determining that the sequence/cyclic shift is associated with the slot or mini-slot including sidelink data 1214 (and not sidelink data 1216).

Figure 13:
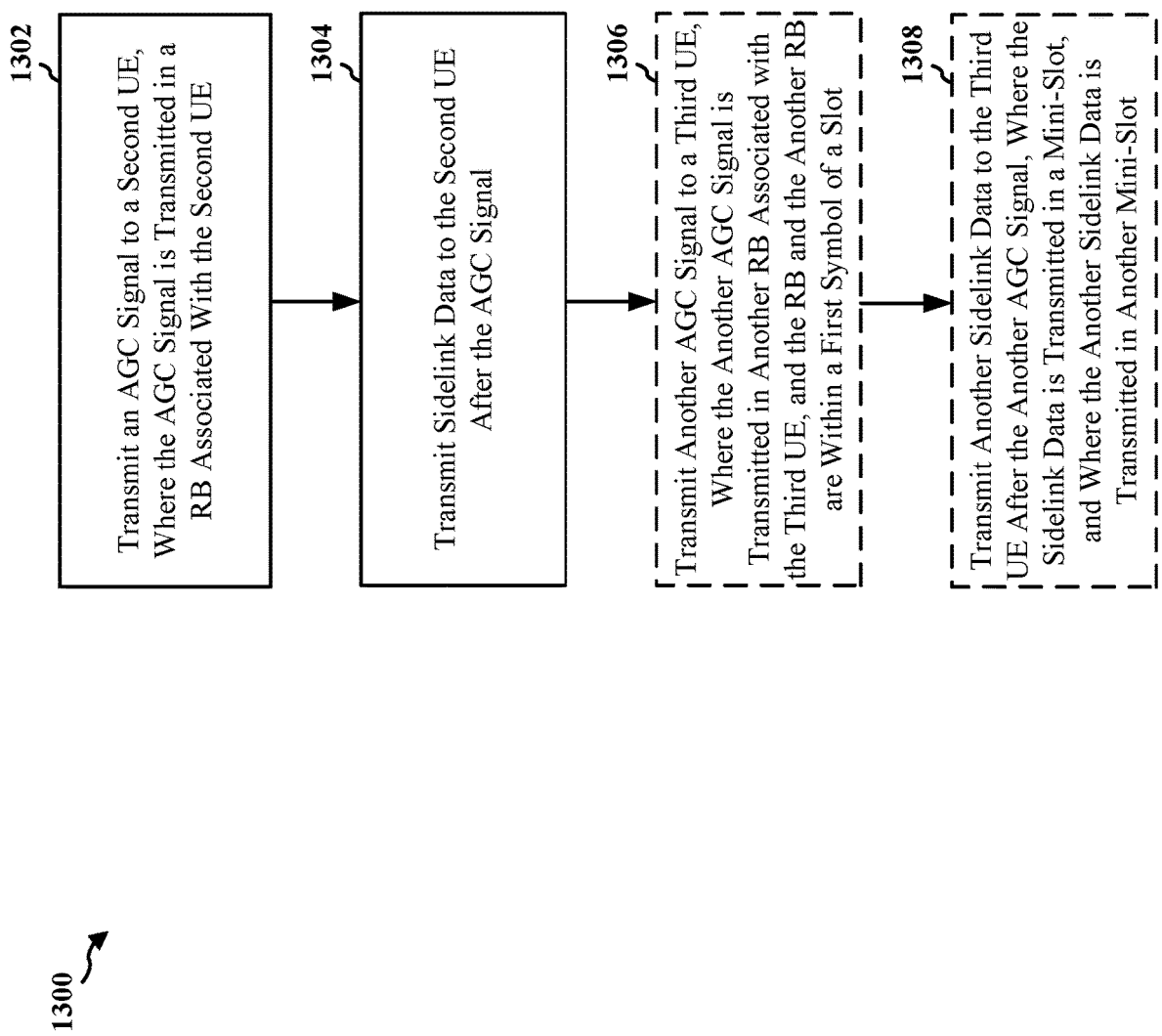
FIG. 13 is a flowchart of a method of wireless communication at a Tx UE.

FIG. 13 is a flowchart 1300 of a method of wireless communication at a UE (e.g., a Tx UE). The method may be performed by a first UE (e.g., the UE 104; first wireless communication device 410, Tx UE 702, 802, 1002, 1102; the apparatus 1502) in communication with a second UE (e.g., second wireless communication device 450, first Rx UE 706, 1006, 1106, Rx UE 806). Optional aspects are illustrated in dashed lines. The method allows a Tx UE to indicate, using the AGC symbol, the target Rx UE of a sidelink communication, in order to reduce PSCCH and PSSCH monitoring and processing time of the Rx UE.

At 1302, the first UE transmits an AGC signal to the second UE, where the AGC signal is transmitted in a RB associated with the second UE. For example, 1302 may be performed by AGC signal component 1540. For instance, referring to FIG. 12, Tx UE 1204 (the first UE) may transmit AGC signal 1212 to first Rx UE 1206 (the second UE). The AGC signal may be transmitted in an RB (e.g., RB 1017, 1117) associated with the first Rx UE. For example, referring to FIGS. 10 and 11, if the Rx UE has a destination ID of 13 (e.g., SL UE 13) and function (1) is configured to apply (with N=11 RBs), the Tx UE may transmit the AGC signal to the first Rx UE in RB 2 since that RB corresponds to SL UE 13. In one example, the Tx UE 1204 (e.g., first wireless communication device 410) may transmit the AGC signal to the first Rx UE 1206 (e.g., second wireless communication device 450) according to the following example process: the UE may encode the AGC signal (e.g., in the controller/processor 459), the UE may modulate the encoded AGC signal (e.g., in the TX processor 468), and the UE may send the modulated and encoded AGC signal using one or more of the antennas 452.

In a first example, the RB may be a function of an identifier of the second UE. For instance, referring to FIGS. 10-12, the identifier for the RB 1017, 1117 in which AGC signal 1212 is transmitted (e.g., RB 2 in the examples of FIGS. 10-12) may be a function of the identifier of the first Rx UE 1206. For example, the function may be given by function (1) described above.

In a second example, the RB may also be a function of an identifier of the first UE. For instance, referring to FIGS. 10-12, the identifier for the RB 1017, 1117 in which AGC signal 1212 is transmitted (e.g., RB 2 in the examples of FIGS. 10-12) may be a function of the identifier of the Tx UE 1204 as well as the identifier of the first Rx UE 1206. For example, the function may be given by function (2) described above.

In a third example, the RB may be one of a plurality of RBs in a sidelink transmission resource pool. For instance, referring to FIGS. 10-12, the RB associated with the first Rx UE 1206 (e.g., RB 2 in the examples of FIGS. 10-12) may be one of multiple RBs 1017, 1117 in a Tx resource pool (e.g., Tx resource pool 1016). In one example, the RB may be a function of a quantity of the RBs in the sidelink transmission resource pool. For instance, referring to FIGS. 10-12, the identifier for the RB 1017, 1117 in which AGC signal 1212 is transmitted may be a function of the number of the RBs 1017, 1117 configured in the Tx resource pool (e.g., Tx resource pool 1016). For example, the quantity may be represented by the value N in the function (1) or (2) described above.

In a fourth example, the RB may be one of a plurality of RBs in a designated set of RBs for AGC signals indicating sidelink UEs. For instance, referring to FIGS. 10-12, the RB associated with the first Rx UE 1206 (e.g., RB 2 in the examples of FIGS. 10-12) may be one of multiple RBs 1017, 1117 in a designated set of RBs (e.g., designated set of RBs 1116) for identifying target Rx UEs of sidelink communications via AGC signals. In one example, the RB may be a function of a quantity of the RBs in the designated set of RBs. For instance, referring to FIGS. 10-12, the identifier for the RB 1017, 1117 in which AGC signal 1212 is transmitted may be a function of the number of the RBs 1017, 1117 in the designated set of RBs (e.g., designated set of RBs 1116). For example, the quantity may be represented by the value N in the function (1) or (2) described above.

At 1304, the first UE transmits sidelink data to the second UE after the AGC signal. For example, 1304 may be performed by sidelink data component 1542. For instance, referring to FIG. 12, the Tx UE 1204 may transmit sidelink data 1214 to the first Rx UE 1206 following the AGC signal 1212. In one example, the Tx UE 1204 (e.g., first wireless communication device 410) may transmit the sidelink data to the first Rx UE 1206 (e.g., second wireless communication device 450) according to the following example process: the UE may encode the sidelink data (e.g., in the controller/processor 459), the UE may modulate the encoded sidelink data (e.g., in the TX processor 468), and the UE may send the modulated and encoded sidelink data using one or more of the antennas 452.

In a fifth example, the AGC signal and the sidelink data may be transmitted in a mini-slot. For instance, referring to the aforementioned Figures, the Tx UE 1204 may transmit the AGC signal 1212 and the sidelink data 1214 within mini-slot 601, 621, 641, 716, 808, 1012, 1112 to the first Rx UE 1206.

In a sixth example, the sidelink data may be transmitted in a mini-slot, and the AGC signal may be transmitted prior to the mini-slot in a first symbol of a slot including the mini-slot. For instance, referring to the aforementioned Figures, the Tx UE 1204 may transmit the sidelink data 1214 within mini-slot 641, 1112 to the first Rx UE 1206, and the Tx UE 1204 may transmit the AGC signal 1212 within AGC symbol 648, 1115 prior to the mini-slot 641, 1112. The AGC symbol 648, 1115 may be the first symbol of the slot 640, 1114 including the mini-slot 641, 1112 in which the sidelink data is transmitted, as illustrated for example in FIGS. 6C and 11. In one example, the AGC signal may include a sequence indicating the mini-slot. For instance, referring to the aforementioned Figures, the AGC signal 1212 may include a PUCCH format 0 sequence which is associated (e.g., in a configuration) with one of the mini-slots 641, 1112. For example, referring to FIG. 11, the AGC signal in the sidelink communication 1104 intended for SL UE 13 may include an orthogonal sequence associated with mini-slot 1. The sequence may include a cyclic shift associated with an index for the mini-slot. For instance, referring to the aforementioned Figures, the PUCCH format 0 sequence of the AGC signal 1212 intended for SL UE 13 may include first cyclic shift 1118 associated with mini-slot 1 (e.g., the mini-slot 1112 having index 0 may be associated with cyclic shift 0).

At 1306, the first UE may transmit another AGC signal to a third UE, where the another AGC signal is transmitted in another RB associated with the third UE, and the RB and the another RB may be within the first symbol of the slot referenced in the sixth example. For example, 1306 may be performed by AGC signal component 1540. For instance, referring to FIG. 12, Tx UE 1204 (the first UE) may transmit AGC signal 1212 to first Rx UE 1206 (the second UE) and another one of AGC signal 1212 to second Rx UE 1208 (the third UE). The another one of AGC signal 1212 may be transmitted in an RB (e.g., RB 1017, 1117) associated with the second Rx UE (e.g., in a different RB than that of AGC signal 1212 corresponding to first Rx UE 1206). For example, referring to FIG. 11, if the second Rx UE has a destination ID of 23 (e.g., SL UE 23) and function (1) is configured to apply (with N=11 RBs), the Tx UE may transmit the AGC signal to the second Rx UE in RB 1 since that RB corresponds to SL UE 23. Here, the RB 1117 corresponding to the first Rx UE (e.g., RB 2 for SL UE 13) and the RB 1117 corresponding to the second Rx UE (e.g., RB 1 for SL UE 23) may be within the AGC symbol 1115 which is the first symbol of the slot 1114 as illustrated in FIG. 11. In one example, the Tx UE 1204 (e.g., first wireless communication device 410) may transmit the another AGC signal to the second Rx UE 1208 (e.g., second wireless communication device 450) according to the following example process: the UE may encode the AGC signal (e.g., in the controller/processor 459), the UE may modulate the encoded AGC signal (e.g., in the TX processor 468), and the UE may send the modulated and encoded AGC signal using one or more of the antennas 452.

Finally, at 1308, the first UE may transmit another sidelink data to the third UE after the another AGC signal transmitted at 1306, where the another sidelink data is transmitted in another mini-slot. For example, 1308 may be performed by sidelink data component 1542. For instance, referring to FIG. 12, the Tx UE 1204 may transmit sidelink data 1216 to the second Rx UE 1208 after transmitting the another one of the AGC signal 1212 (which AGC signal was transmitted in a different RB than that corresponding to first Rx UE 1206). Moreover, the Tx UE 1204 may transmit the sidelink data 1216 in a different one of the mini-slots 641, 1112 (e.g., mini-slot 2 in FIG. 11) than the mini-slot applied for the first Rx UE 1206 (e.g., mini-slot 1 in FIG. 11). In one example, the Tx UE 1204 (e.g., first wireless communication device 410) may transmit the another sidelink data to the first Rx UE 1206 (e.g., second wireless communication device 450) according to the following example process: the UE may encode the sidelink data (e.g., in the controller/processor 459), the UE may modulate the encoded sidelink data (e.g., in the TX processor 468), and the UE may send the modulated and encoded sidelink data using one or more of the antennas 452.

In a seventh example, the AGC signal may include a cyclic shift associated with the mini-slot, and the another AGC signal may include another cyclic shift associated with the another mini-slot. For instance, referring to the aforementioned Figures, the AGC signal 1212 transmitted in the RB corresponding to the first Rx UE 1206 (e.g., RB 2 in the example of FIG. 11) may include a PUCCH format 0 sequence including first cyclic shift 1118 (e.g., cyclic shift 0) which is associated (e.g., in a configuration) with one of the mini-slots 641, 1112 (e.g., mini-slot 1). In contrast, the another one of the AGC signals 1212 transmitted in the RB corresponding to the second Rx UE 1208 (e.g., RB 1 in the example of FIG. 11) may include a PUCCH format 0 sequence including second cyclic shift 1120 (e.g., cyclic shift 6) which is associated (e.g., in the configuration) with a different one of the mini-slots 641, 1112 (e.g., mini-slot 2).

Figure 14:
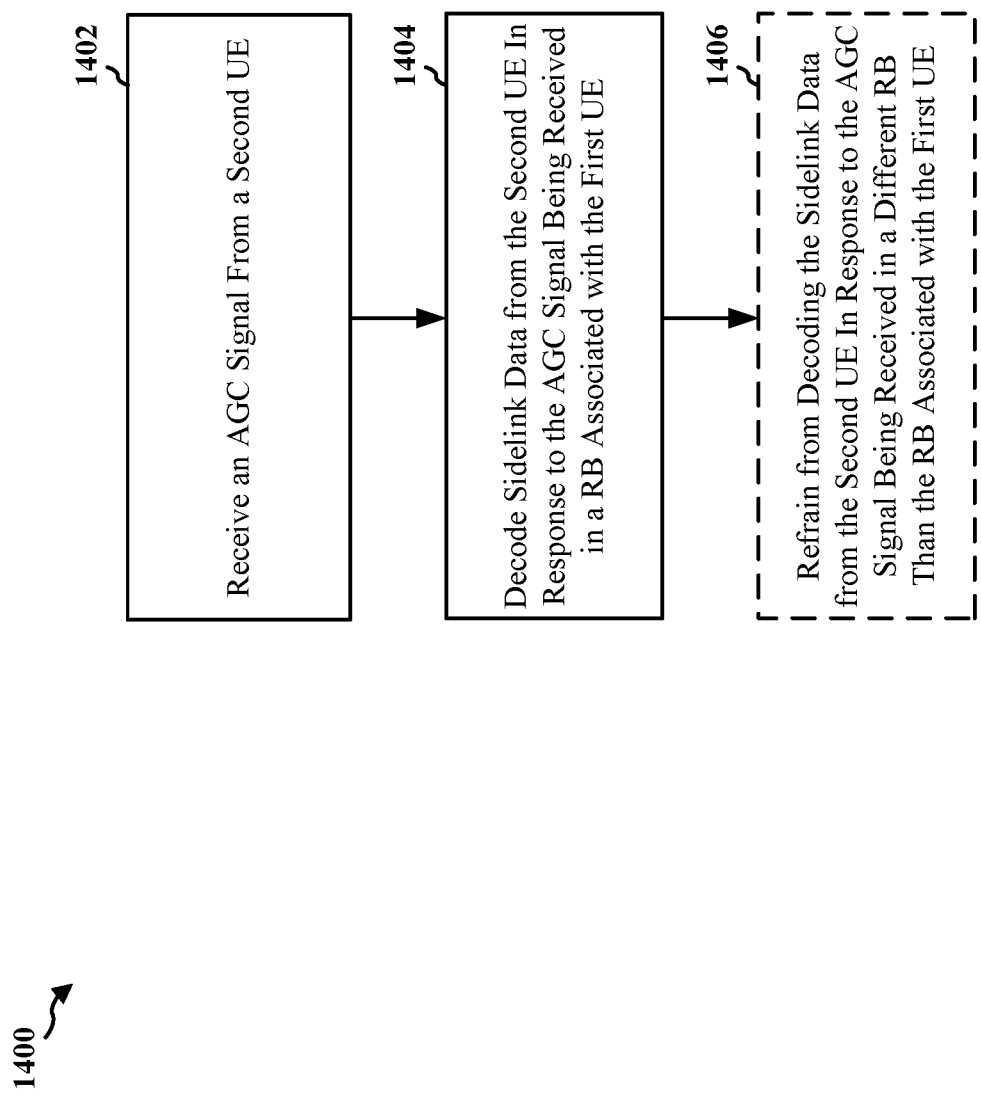
FIG. 14 is a flowchart of a method of wireless communication at a Rx UE.

FIG. 14 is a flowchart 1400 of a method of wireless communication at a UE (e.g., a Rx UE). The method may be performed by a first UE (e.g., second wireless communication device 450, first Rx UE 706, 1006, 1106, Rx UE 806; the apparatus 1502) in communication with a second UE (e.g., the UE 104; first wireless communication device 410, Tx UE 702, 802, 1002, 1102). Optional aspects are illustrated in dashed lines. The method allows a Rx UE to reduce PSCCH and PSSCH monitoring and processing time of a sidelink communication in response to receiving from a Tx UE an AGC symbol indicating whether the Rx UE is the target Rx UE of the sidelink communication.

At 1402, the first UE receives an AGC signal from a second UE. For example, 1402 may be performed by AGC signal component 1540. For instance, referring to FIG. 12, first Rx UE 1206 (the first UE) may receive AGC signal 1212 from Tx UE 1204 (the second UE). In one example, the first Rx UE 1206 (e.g., second wireless communication device 450) may receive the AGC signal from Tx UE 1204 (e.g., first wireless communication device 410) according to the following example process: the UE may obtain the AGC signal using one or more of the antennas 452, the UE may demodulate the obtained AGC signal (e.g., in RX processor 456), and the UE may decode the demodulated AGC signal (e.g., in the controller/processor 459). The Rx UE may also store the decoded AGC signal in memory 460.

At 1404, the first UE decodes sidelink data from the second UE in response to the AGC signal being received in a RB associated with the first UE. For example, 1404 may be performed by sidelink data component 1542. For instance, referring to FIG. 12, at block 1218, the first Rx UE 1206 may decode sidelink data 1214 from the Tx UE 1204 in response to receiving (at 1402) the AGC signal 1212 in an RB (e.g., RB 1017, 1117) associated with the first Rx UE. For example, referring to FIGS. 10 and 11, if the Rx UE has a destination ID of 13 (e.g., SL UE 13) and function (1) is configured to apply (with N=11 RBs), the first Rx UE 1206 may decode the sidelink data at block 1218 in response to sensing power (of the AGC signal) in RB 2 since that RB corresponds to SL UE 13. In one example, the first Rx UE 1206 (e.g., second wireless communication device 450) may decode the sidelink data according to the following example process: the UE may determine (e.g., in the controller/processor 459) that the AGC signal was received in its corresponding RB, the UE may obtain the sidelink data using one or more of the antennas 452 in response to the determination, and the UE may demodulate the obtained sidelink data (e.g., in RX processor 456). In one example, the UE may determine that the AGC signal was received in its corresponding RB in response to measuring an RSRP in the corresponding RB, and identifying that the measured RSRP meets an RSRP threshold.

In a first example, the RB may be a function of an identifier of the first UE. For instance, referring to FIGS. 10-12, the identifier for the RB 1017, 1117 in which AGC signal 1212 is received (e.g., RB 2 in the examples of FIGS. 10-12) may be a function of the identifier of the first Rx UE 1206. For example, the function may be given by function (1) described above.

In a second example, the RB may also be a function of an identifier of the second UE. For instance, referring to FIGS. 10-12, the identifier for the RB 1017, 1117 in which AGC signal 1212 is received (e.g., RB 2 in the examples of FIGS. 10-12) may be a function of the identifier of the Tx UE 1204 as well as the identifier of the first Rx UE 1206. For example, the function may be given by function (2) described above.

In a third example, the RB may be one of a plurality of RBs in a sidelink transmission resource pool. For instance, referring to FIGS. 10-12, the RB associated with the first Rx UE 1206 (e.g., RB 2 in the examples of FIGS. 10-12) may be one of multiple RBs 1017, 1117 in a Tx resource pool (e.g., Tx resource pool 1016). In one example, the RB may be a function of a quantity of the RBs in the sidelink transmission resource pool. For instance, referring to FIGS. 10-12, the identifier for the RB 1017, 1117 in which AGC signal 1212 is received may be a function of the number of the RBs 1017, 1117 configured in the Tx resource pool (e.g., Tx resource pool 1016). For example, the quantity may be represented by the value N in the function (1) or (2) described above.

In a fourth example, the RB may be one of a plurality of RBs in a designated set of RBs for AGC signals indicating sidelink UEs. For instance, referring to FIGS. 10-12, the RB associated with the first Rx UE 1206 (e.g., RB 2 in the examples of FIGS. 10-12) may be one of multiple RBs 1017, 1117 in a designated set of RBs (e.g., designated set of RBs 1116) for identifying target Rx UEs of sidelink communications via AGC signals. In one example, the RB may be a function of a quantity of the RBs in the designated set of RBs. For instance, referring to FIGS. 10-12, the identifier for the RB 1017, 1117 in which AGC signal 1212 is received may be a function of the number of the RBs 1017, 1117 in the designated set of RBs (e.g., designated set of RBs 1116). For example, the quantity may be represented by the value N in the function (1) or (2) described above.

In a fifth example, the AGC signal and the sidelink data may be received in a mini-slot. For instance, referring to the aforementioned Figures, the first Rx UE 1206 may receive the AGC signal 1212 and the sidelink data 1214 within mini-slot 601, 621, 641, 716, 808, 1012, 1112 from the Tx UE 1204.

In a sixth example, the sidelink data may be received in a mini-slot, and the AGC signal may be received prior to the mini-slot in a first symbol of a slot including the mini-slot. For instance, referring to the aforementioned Figures, the first Rx UE 1206 may receive the sidelink data 1214 within mini-slot 641, 1112 from the Tx UE 1204, and the first Rx UE 1206 may receive the AGC signal 1212 within AGC symbol 648, 1115 prior to the mini-slot 641, 1112. The AGC symbol 648, 1115 may be the first symbol of the slot 640, 1114 including the mini-slot 641, 1112 in which the sidelink data is received, as illustrated for example in FIGS. 6C and 11. In one example, the AGC signal may include a sequence indicating the mini-slot. For instance, referring to the aforementioned Figures, the AGC signal 1212 may include a PUCCH format 0 sequence which is associated (e.g., in a configuration) with one of the mini-slots 641, 1112. For example, referring to FIG. 11, the AGC signal in the sidelink communication 1104 intended for SL UE 13 may include an orthogonal sequence associated with mini-slot 1. The sequence may include a cyclic shift associated with an index for the mini-slot. For instance, referring to the aforementioned Figures, the PUCCH format 0 sequence of the AGC signal 1212 intended for SL UE 13 may include first cyclic shift 1118 associated with mini-slot 1 (e.g., the mini-slot 1112 having index 0 may be associated with cyclic shift 0).

Finally, at 1406, the first UE refrains from decoding the sidelink data from the second UE in response to the AGC signal being received in a different RB than the RB associated with the first UE. For example, 1406 may be performed by sidelink data component 1542. For instance, referring to FIG. 12, at block 1220, the first Rx UE 1206 may refrain from decoding sidelink data 1216 from the Tx UE 1204 in response to receiving (at 1402) the AGC signal 1212 in an RB (e.g., RB 1017, 1117) different than the RB associated with the first Rx UE. For example, referring to FIGS. 10 and 11, if the Rx UE has a destination ID of 13 (e.g., SL UE 13) and function (1) is configured to apply (with N=11 RBs), the first Rx UE 1206 may refrain from decoding the sidelink data at block 1220 in response to sensing power (of the AGC signal) in RB 1 (or in response to not sensing the power in RB 2) since the RB containing the AGC signal does not correspond to SL UE 13. In one example, the first Rx UE 1206 (e.g., second wireless communication device 450) may refrain from decoding the sidelink data according to the following example process: the UE may determine (e.g., in the controller/processor 459) that the AGC signal was not received in its corresponding RB, and the UE may cease applying power to its antennas 452 and not obtain the sidelink data in response to the determination. In one example, the UE may determine that the AGC signal was not received in its corresponding RB in response to measuring an RSRP in the corresponding RB, and identifying that the measured RSRP does not meet an RSRP threshold.

Figure 15:
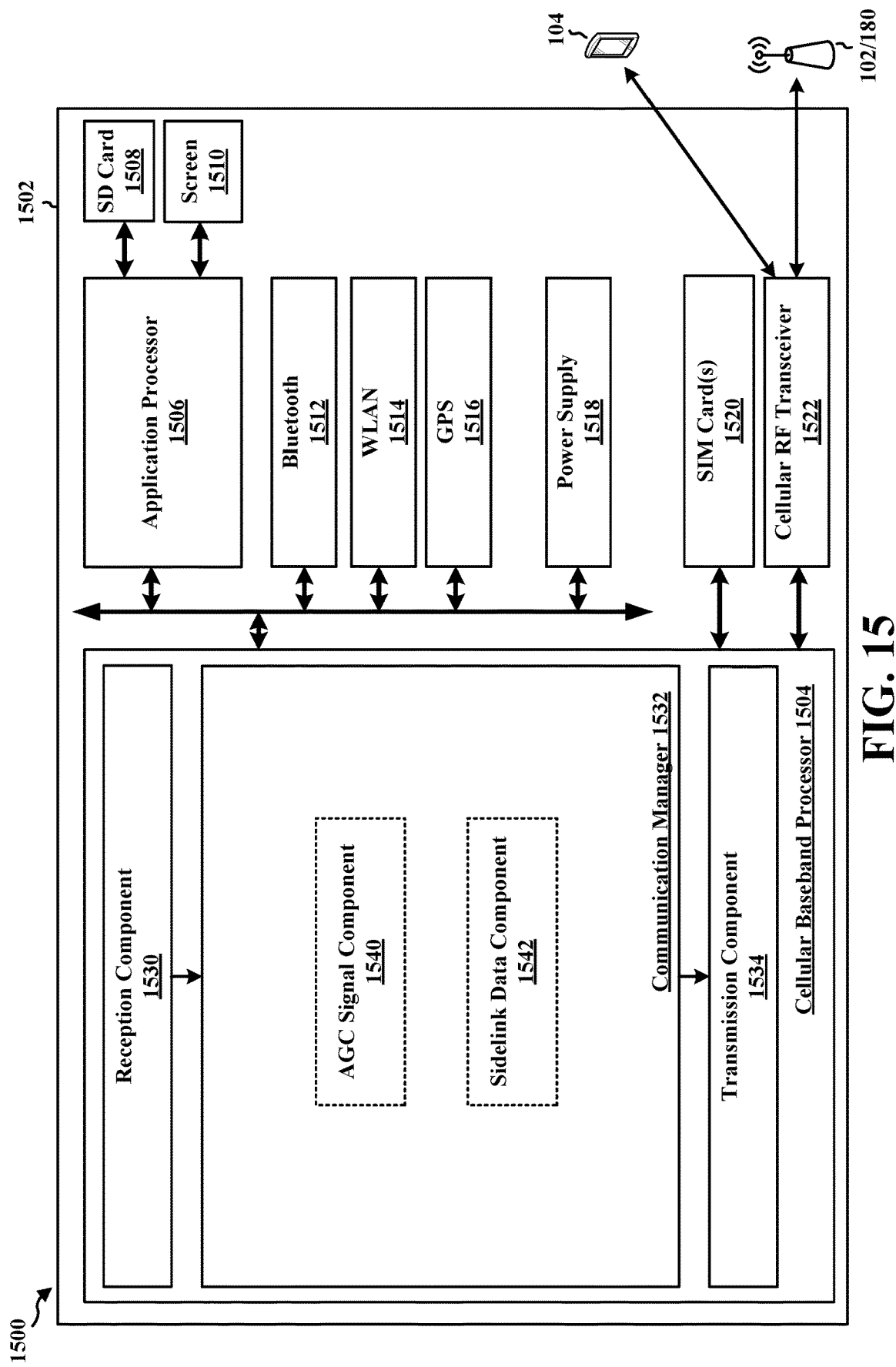
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 410, 450 and may include the memory 460, 476 and/or at least one of the TX processor 416, 468, the RX processor 456, 470, and the controller/processor 459, 475. In one configuration, the apparatus 1502 may be a modem chip and include just the baseband processor 1504, and in another configuration, the apparatus 1502 may be the entire UE (e.g., see 410, 450 of FIG. 4) and include the aforediscussed additional modules of the apparatus 1502.

The communication manager 1532 includes an AGC signal component 1540 that is configured to transmit an AGC signal to a second UE, where the AGC signal is transmitted in a RB associated with the second UE, e.g., as described in connection with 1302. The AGC signal component 1540 is also configured to receive an AGC signal from a second UE, e.g., as described in connection with 1402. The AGC signal component 1540 is also configured to transmit another AGC signal to a third UE, where the another AGC signal is transmitted in another RB associated with the third UE, and the RB and the another RB are within the first symbol of a slot, e.g., as described in connection with 1306. The communication manager 1532 further includes a sidelink data component 1542 that is configured to transmit sidelink data to the second UE after the AGC signal, e.g., as described in connection with 1304. The sidelink data component 1542 is also configured to decode sidelink data from the second UE in response to the AGC signal being received in a RB associated with the first UE, e.g., as described in connection with 1404. The sidelink data component 1542 is also configured to transmit another sidelink data to the third UE after the another AGC signal, where the another sidelink data is transmitted in another mini-slot, e.g., as described in connection with 1308. The sidelink data component 1542 is also configured to refrain from decoding the sidelink data from the second UE in response to the AGC signal being received in a different RB than the RB associated with the first UE, e.g., as described in connection with 1406.

The apparatus may include additional components that perform each of the blocks of the algorithm in the aforementioned flowcharts of FIGS. 12-14. As such, each block in the aforementioned flowcharts of FIGS. 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for transmitting an automatic gain control (AGC) signal to a second UE, wherein the AGC signal is transmitted in a resource block (RB) associated with the second UE; and wherein the means for transmitting is further configured to transmit sidelink data to the second UE after the AGC signal.

In one configuration, the RB is a function of an identifier of the second UE.

In one configuration, the RB is also a function of an identifier of the first UE.

In one configuration, the RB is one of a plurality of RBs in a sidelink transmission resource pool. In one configuration, the RB is a function of a quantity of the RBs in the sidelink transmission resource pool.

In one configuration, the RB is one of a plurality of RBs in a designated set of RBs for AGC signals indicating sidelink UEs. In one configuration, the RB is a function of a quantity of the RBs in the designated set of RBs.

In one configuration, the AGC signal and the sidelink data are transmitted in a mini-slot.

In one configuration, the sidelink data is transmitted in a mini-slot, and the AGC signal is transmitted prior to the mini-slot in a first symbol of a slot including the mini-slot. In one configuration, the AGC signal includes a sequence indicating the mini-slot. In one configuration, the sequence includes a cyclic shift associated with an index for the mini-slot. In one configuration, the means for transmitting may further be configured to transmit another AGC signal to a third UE, wherein the another AGC signal is transmitted in another RB associated with the third UE, and the RB and the another RB are within the first symbol of the slot; and wherein the means for transmitting may be further configured to transmit another sidelink data to the third UE after the another AGC signal, wherein the another sidelink data is transmitted in another mini-slot. In one configuration, the AGC signal includes a cyclic shift associated with the mini-slot, and the another AGC signal includes another cyclic shift associated with the another mini-slot.

In one configuration, the apparatus 1502, and in particular the cellular baseband processor 1504, includes means for receiving an automatic gain control (AGC) signal from a second UE; and means for decoding sidelink data from the second UE in response to the AGC signal being received in a resource block (RB) associated with the first UE.

In one configuration, the RB is a function of an identifier of the first UE.

In one configuration, the RB is also a function of an identifier of the second UE.

In one configuration, the RB is one of a plurality of RBs in a sidelink transmission resource pool. In one configuration, the RB is a function of a quantity of the RBs in the sidelink transmission resource pool.

In one configuration, the RB is one of a plurality of RBs in a designated set of RBs for AGC signals indicating sidelink UEs. In one configuration, the RB is a function of a quantity of the RBs in the designated set of RBs.

In one configuration, the AGC signal and the sidelink data are received in a mini-slot.

In one configuration, the sidelink data is received in a mini-slot, and the AGC signal is received prior to the mini-slot in a first symbol of a slot including the mini-slot. In one configuration, the AGC signal includes a sequence indicating the mini-slot. In one configuration, the sequence includes a cyclic shift associated with an index for the mini-slot.

In one configuration, the apparatus 1502, and in particular the cellular baseband processor 1504, may include means for refraining from decoding the sidelink data from the second UE in response to the AGC signal being received in a different RB than the RB associated with the first UE.

The aforementioned means may be one or more of the aforementioned components of the apparatus 1502 configured to perform the functions recited by the aforementioned means. As described supra, the apparatus 1502 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means. Alternatively, as also described supra, the apparatus 1502 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

Thus, rather than simply applying AGC symbols for purposes of setting AGC, the various aspects described throughout the present disclosure allow AGC symbols to be additionally (or alternatively) applied for identifying or indicating target Rx UEs of a sidelink communication. In this way, Rx UEs may save monitoring and processing power and time in receiving and decoding sidelink communications.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a first user equipment (UE), comprising: transmitting an automatic gain control (AGC) signal to a second UE, wherein the AGC signal is transmitted in a resource block (RB) associated with the second UE; and transmitting sidelink data to the second UE after the AGC signal.

Example 2 is the method of Example 1, wherein the RB is a function of an identifier of the second UE.

Example 3 is the method of Example 2, wherein the RB is also a function of an identifier of the first UE.

Example 4 is the method of any of Examples 1 to 3, wherein the RB is one of a plurality of RBs in a sidelink transmission resource pool.

Example 5 is the method of Example 4, wherein the RB is a function of a quantity of the RBs in the sidelink transmission resource pool.

Example 6 is the method of any of Examples 1 to 3, wherein the RB is one of a plurality of RBs in a designated set of RBs for AGC signals indicating sidelink UEs.

Example 7 is the method of Example 6, wherein the RB is a function of a quantity of the RBs in the designated set of RBs.

Example 8 is the method of any of Examples 1 to 7, wherein the AGC signal and the sidelink data are transmitted in a mini-slot.

Example 9 is the method of any of Examples 1 to 7, wherein the sidelink data is transmitted in a mini-slot, and the AGC signal is transmitted prior to the mini-slot in a first symbol of a slot including the mini-slot.

Example 10 is the method of Example 9, wherein the AGC signal includes a sequence indicating the mini-slot.

Example 11 is the method of Example 10, wherein the sequence includes a cyclic shift associated with an index for the mini-slot.

Example 12 is the method of any of Examples 9 to 11, further comprising: transmitting another AGC signal to a third UE, wherein the another AGC signal is transmitted in another RB associated with the third UE, and the RB and the another RB are within the first symbol of the slot; and transmitting another sidelink data to the third UE after the another AGC signal, wherein the another sidelink data is transmitted in another mini-slot.

Example 13 is the method of Example 12, wherein the AGC signal includes a cyclic shift associated with the mini-slot, and the another AGC signal includes another cyclic shift associated with the another mini-slot.

Example 14 is an apparatus for wireless communication, comprising: a processor; memory coupled with the processor; and instructions stored in the memory and operable, when executed by the processor, to cause the apparatus to: transmit an automatic gain control (AGC) signal to a second UE, wherein the AGC signal is transmitted in a resource block (RB) associated with the second UE; and transmit sidelink data to the second UE after the AGC signal.

Example 15 is the apparatus of Example 14, wherein the sidelink data is transmitted in a mini-slot, and the AGC signal is transmitted prior to the mini-slot in a first symbol of a slot including the mini-slot.

Example 16 is the apparatus of Example 15, wherein the instructions, when executed by the processor, further cause the apparatus to: transmit another AGC signal to a third UE, wherein the another AGC signal is transmitted in another RB associated with the third UE, and the RB and the another RB are within the first symbol of the slot; and transmit another sidelink data to the third UE after the another AGC signal, wherein the another sidelink data is transmitted in another mini-slot.

Example 17 is a method of wireless communication at a first user equipment (UE), comprising: receiving an automatic gain control (AGC) signal from a second UE; and decoding sidelink data from the second UE in response to the AGC signal being received in a resource block (RB) associated with the first UE.

Example 18 is the method of Example 17, wherein the RB is a function of an identifier of the first UE.

Example 19 is the method of Example 18, wherein the RB is also a function of an identifier of the second UE.

Example 20 is the method of any of Examples 17 to 19, wherein the RB is one of a plurality of RBs in a sidelink transmission resource pool.

Example 21 is the method of Example 20, wherein the RB is a function of a quantity of the RBs in the sidelink transmission resource pool.

Example 22 is the method of any of Examples 17 to 19, wherein the RB is one of a plurality of RBs in a designated set of RBs for AGC signals indicating sidelink UEs.

Example 23 is the method of Example 22, wherein the RB is a function of a quantity of the RBs in the designated set of RBs.

Example 24 is the method of any of Examples 17 to 23, wherein the AGC signal and the sidelink data are received in a mini-slot.

Example 25 is the method of any of Examples 17 to 23, wherein the sidelink data is received in a mini-slot, and the AGC signal is received prior to the mini-slot in a first symbol of a slot including the mini-slot.

Example 26 is the method of Example 25, wherein the AGC signal includes a sequence indicating the mini-slot.

Example 27 is the method of Example 26, wherein the sequence includes a cyclic shift associated with an index for the mini-slot.

Example 28 is the method of any of Examples 17 to 27, further comprising: refraining from decoding the sidelink data from the second UE in response to the AGC signal being received in a different RB than the RB associated with the first UE.

Example 29 is an apparatus for wireless communication, comprising: a processor; memory coupled with the processor; and instructions stored in the memory and operable, when executed by the processor, to cause the apparatus to: receive an automatic gain control (AGC) signal from a second UE; and decode sidelink data from the second UE in response to the AGC signal being received in a resource block (RB) associated with the first UE.

Example 30 is the apparatus of Example 29, wherein the instructions, when executed by the processor, further cause the apparatus to: refrain from decoding the sidelink data from the second UE in response to the AGC signal being received in a different RB than the RB associated with the first UE.

What is claimed is:

1. A method of wireless communication at a first user equipment (UE), comprising:
    transmitting an automatic gain control (AGC) signal in an AGC symbol to a second UE, the AGC symbol indicating that the second UE is a target of a sidelink communication based on a correspondence of the second UE with a frequency domain location of a resource block (RB including the AGC signal; and
    transmitting sidelink data in the sidelink communication to the second UE after the AGC signal.

2. The method of claim 1, wherein the RB is a function of an identifier of the second UE.

3. The method of claim 2, wherein the RB is also a function of an identifier of the first UE.

4. The method of claim 1, wherein the RB is one of a plurality of RBs in a sidelink transmission resource pool.

5. The method of claim 4, wherein the RB is a function of a quantity of the RBs in the sidelink transmission resource pool.

6. The method of claim 1, wherein the RB is one of a plurality of RBs in a designated set of RBs for AGC signals indicating sidelink UEs.

7. The method of claim 6, wherein the RB is a function of a quantity of the RBs in the designated set of RBs.

8. The method of claim 1, wherein the AGC signal and the sidelink data are transmitted in a mini-slot.

9. The method of claim 1, wherein the sidelink data is transmitted in a mini-slot, and the AGC signal is transmitted prior to the mini-slot in a first symbol of a slot including the mini-slot.

10. The method of claim 9, wherein the AGC signal includes a sequence indicating the mini-slot.

11. The method of claim 10, wherein the sequence includes a cyclic shift associated with an index for the mini-slot.

12. The method of claim 9, further comprising:
    transmitting another AGC signal to a third UE, wherein the another AGC signal is transmitted in another RB associated with the third UE, and the RB and the another RB are within the first symbol of the slot; and
    transmitting another sidelink data to the third UE after the another AGC signal, wherein the another sidelink data is transmitted in another mini-slot.

13. The method of claim 12, wherein the AGC signal includes a cyclic shift associated with the mini-slot, and the another AGC signal includes another cyclic shift associated with the another mini-slot.

14. An apparatus for wireless communication, comprising:
- a processor;
- memory coupled with the processor; and
- instructions stored in the memory and operable, when executed by the processor, to cause the apparatus to:
  - transmit an automatic gain control (AGC) signal in an AGC symbol to a user equipment (UE), the AGC symbol indicating that the UE is a target of a sidelink communication based on a correspondence of the UE with a frequency domain location of a resource block (RB) including the AGC signal; and
  - transmit sidelink data in the sidelink communication to the UE after the AGC signal.

15. The apparatus of claim 14, wherein the sidelink data is transmitted in a mini-slot, and the AGC signal is transmitted prior to the mini-slot in a first symbol of a slot including the mini-slot.

16. The apparatus of claim 15, wherein the instructions, when executed by the processor, further cause the apparatus to:
- transmit another AGC signal to a second UE, wherein the another AGC signal is transmitted in another RB associated with the second UE, and the RB and the another RB are within the first symbol of the slot; and
- transmit another sidelink data to the second UE after the another AGC signal, wherein the another sidelink data is transmitted in another mini-slot.

17. A method of wireless communication at a first user equipment (UE), comprising:
- receiving an automatic gain control (AGC) signal in an AGC symbol from a second UE, the AGC symbol indicating that the first UE is a target of a sidelink communication based on a correspondence of the first UE with a frequency domain location of a resource block (RB) including the AGC signal; and
- decoding sidelink data in the sidelink communication from the second UE in response to the AGC signal.

18. The method of claim 17, wherein the RB is a function of an identifier of the first UE.

19. The method of claim 18, wherein the RB is also a function of an identifier of the second UE.

20. The method of claim 17, wherein the RB is one of a plurality of RBs in a sidelink transmission resource pool.

21. The method of claim 20, wherein the RB is a function of a quantity of the RBs in the sidelink transmission resource pool.

22. The method of claim 17, wherein the RB is one of a plurality of RBs in a designated set of RBs for AGC signals indicating sidelink UEs.

23. The method of claim 22, wherein the RB is a function of a quantity of the RBs in the designated set of RBs.

24. The method of claim 17, wherein the AGC signal and the sidelink data are received in a mini-slot.

25. The method of claim 17, wherein the sidelink data is received in a mini-slot, and the AGC signal is received prior to the mini-slot in a first symbol of a slot including the mini-slot.

26. The method of claim 25, wherein the AGC signal includes a sequence indicating the mini-slot.

27. The method of claim 26, wherein the sequence includes a cyclic shift associated with an index for the mini-slot.

28. The method of claim 17, further comprising:
- refraining from decoding the sidelink data from the second UE in response to the AGC signal being received in a different RB than the RB associated with the first UE.

29. An apparatus for wireless communication, comprising:
- a processor;
- memory coupled with the processor; and
- instructions stored in the memory and operable, when executed by the processor, to cause the apparatus to:
  - receive an automatic gain control (AGC) signal in an AGC symbol from a user equipment (UE), the AGC symbol indicating that the apparatus is a target of a sidelink communication based on a correspondence of the apparatus with a frequency domain location of a resource block (RB) including the AGC signal; and
  - decode sidelink data in the sidelink communication from the UE in response to the AGC signal.

30. The apparatus of claim 29, wherein the instructions, when executed by the processor, further cause the apparatus to:
- refrain from decoding the sidelink data from the UE in response to the AGC signal being received in a different RB than the RB associated with the apparatus.

* * * * *